United States Patent
Kerger et al.

(10) Patent No.: US 9,288,639 B2
(45) Date of Patent: Mar. 15, 2016

(54) USER EXPERIENCE ENHANCEMENTS FOR CONTROLLING A GROUP COMMUNICATION

(71) Applicant: QUALCOMM Incorporated, San Diego, CA (US)

(72) Inventors: Kameron N. Kerger, San Diego, CA (US); Devender A. Yamakawa, San Diego, CA (US); Paul J. Lafata, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/819,573

(22) Filed: Aug. 6, 2015

(65) Prior Publication Data

US 2015/0341759 A1     Nov. 26, 2015

Related U.S. Application Data

(62) Division of application No. 13/661,371, filed on Oct. 26, 2012, now Pat. No. 9,154,925.

(60) Provisional application No. 61/554,876, filed on Nov. 2, 2011.

(51) Int. Cl.
  *H04B 7/00*  (2006.01)
  *H04W 4/10*  (2009.01)
  (Continued)

(52) U.S. Cl.
  CPC ............. *H04W 4/10* (2013.01); *G06F 3/04817* (2013.01); *G06F 3/04842* (2013.01);
  (Continued)

(58) Field of Classification Search
  USPC ....................... 455/517–520, 550.1
  See application file for complete search history.

(56) References Cited

U.S. PATENT DOCUMENTS 7,062,286 B2    6/2006  Grivas et al.
7,526,306 B2 *  4/2009  Brems ................ H04M 1/2745
                                                                455/518
(Continued)

FOREIGN PATENT DOCUMENTS

EP    1622406 A1    2/2006
EP    1755292 A2    2/2007
(Continued)

OTHER PUBLICATIONS

International Preliminary Report on Patentability—PCT/US2012/062614, The International Bureau of WIPO—Geneva, Switzerland, Feb. 5, 2014.
(Continued)

*Primary Examiner* — Fayyaz Alam
(74) *Attorney, Agent, or Firm* — Raphael Freiwirth

(57) ABSTRACT

User experience enhancements for conducting group communication sessions may include displaying visual feedback on a display to indicate a state of a group communication session. Embodiments may include displaying a quick contact group communication shortcut icon on a home screen of a wireless communication device display, displaying a group communication button in association with the quick contact group communication shortcut icon on the home screen of the display, detecting a selection of the group communication button by a user on a user interface, and initiating a group communication session with a device of a contact associated with the quick contact group communication shortcut icon.

20 Claims, 26 Drawing Sheets

(51) Int. Cl.
  *G06F 3/0481* (2013.01)
  *G06F 3/0484* (2013.01)
  *H04M 1/725* (2006.01)
  *H04W 4/08* (2009.01)
  *H04L 29/06* (2006.01)

(52) U.S. Cl.
  CPC ....... *H04L 65/1069* (2013.01); *H04L 65/4061* (2013.01); *H04M 1/72577* (2013.01); *H04M 1/72583* (2013.01); *H04W 4/08* (2013.01)

(56) References Cited

U.S. PATENT DOCUMENTS

| | | | |
|---|---|---|---|
| 7,853,280 B2 | 12/2010 | Sadiq et al. | |
| 7,865,205 B1 | 1/2011 | Lundy et al. | |
| 8,983,518 B2* | 3/2015 | Hung | H04L 12/1886 455/416 |
| 2003/0078064 A1 | 4/2003 | Chan | |
| 2003/0153342 A1 | 8/2003 | Crockett et al. | |
| 2004/0266468 A1 | 12/2004 | Brown et al. | |
| 2005/0143135 A1* | 6/2005 | Brems | H04M 1/2745 455/564 |
| 2006/0035657 A1 | 2/2006 | Lim | |
| 2007/0040892 A1* | 2/2007 | Aoki | H04N 7/147 348/14.01 |
| 2007/0233802 A1 | 10/2007 | Kulkarni | |
| 2008/0004038 A1 | 1/2008 | Dunko | |
| 2008/0045257 A1 | 2/2008 | Watson et al. | |
| 2009/0042556 A1 | 2/2009 | Saito | |
| 2009/0054097 A1 | 2/2009 | Kim et al. | |
| 2009/0129295 A1 | 5/2009 | Shibata et al. | |
| 2010/0105440 A1* | 4/2010 | Kruzeniski | G06F 3/0482 455/566 |
| 2010/0251119 A1 | 9/2010 | Geppert et al. | |
| 2010/0257526 A1 | 10/2010 | Zimmet et al. | |
| 2011/0320939 A1* | 12/2011 | Hand | H04M 1/27455 715/702 |
| 2012/0323933 A1* | 12/2012 | He | G06Q 10/109 707/749 |
| 2013/0109425 A1 | 5/2013 | Kerger et al. | |
| 2013/0109426 A1 | 5/2013 | Kerger et al. | |

FOREIGN PATENT DOCUMENTS

| | | |
|---|---|---|
| EP | 1903763 A1 | 3/2008 |
| EP | 1978652 A1 | 10/2008 |
| JP | H056579 U | 1/1993 |
| JP | 2001268078 A | 9/2001 |
| JP | 2005532703 A | 10/2005 |
| JP | 2006042357 A | 2/2006 |
| JP | 2007201916 A | 8/2007 |
| JP | 2008546301 A | 12/2008 |
| JP | 2011030194 A | 2/2011 |
| JP | 2011041246 A | 2/2011 |
| WO | 03036801 A2 | 5/2003 |
| WO | 2006018635 A1 | 2/2006 |
| WO | 2007007847 A1 | 1/2007 |
| WO | 2011003477 A1 | 1/2011 |

OTHER PUBLICATIONS

International Search Report and Written Opinion—PCT/US2012/062609—ISA/EPO—Feb. 7, 2013.

International Search Report and Written Opinion—PCT/US2012/062614—ISA/EPO—Feb. 5, 2013.

"Part 1: Complete Guide of WASTE Capable of Enjoying Safe File Exchange, File Exchange Using Secret P2P Software", Net Runner, Softbank Publishing Inc., Aug. 1, 2003, vol. 5, No. 8, pp. 60-69.

* cited by examiner

USER EXPERIENCE ENHANCEMENTS FOR CONTROLLING A GROUP COMMUNICATION

RELATED APPLICATIONS

This application is a divisional application of U.S. patent application Ser. No. 13/661,371, filed Oct. 26, 2012, which claims the benefit of priority to U.S. Provisional Patent Application No. 61/554,876, filed Nov. 2, 2011, the entire contents of both of which are hereby incorporated by reference for all purposes.

This application is also related to U.S. patent application Ser. No. 13/661,378 entitled "User Experience Enhancements for Limiting Calls in a Group Communication" filed Oct. 26, 2012.

BACKGROUND

The present invention generally relates to wireless telecommunication systems. More particularly, the present invention relates to methods and devices which enable group communication, such as "Push-To-Talk" (PTT) communication, without requiring dedicated PTT hardware.

In wireless telecommunication devices, such as cellular phones, PDAs, mini-laptops, and advanced pagers, the devices typically communicate over long distances by bridging telephone calls through existing cellular telephone networks and passing data packets across the network. These wireless communication devices often have data processing and computing capabilities, and can accordingly send and receive voice and other types of data across the telephone network.

There exists a wireless telecommunication service that provides a quick one-to-one or one-to-many communication that is generically referred to as "Push-To-Talk" (PTT) capability. The specific PTT group of recipient devices for the communicating wireless communication device is commonly set up by the carrier. A PTT communication connection is typically initiated by a single hardware button-push on the wireless communication device that activates a half-duplex link between the speaker and each member device of the group and once the button is released, the device can receive incoming PTT transmissions. Existing PTT systems have advantages over traditional cellular systems because they have faster call setup times, e.g., setup times ideally in the range of 1 second as opposed to cellular voice channels that can take more than 5 seconds to establish. In some arrangements, the PTT speaker will have the "floor" where no other group member can speak while the speaker is speaking. Once the speaker releases the PTT button, any other individual member of the group can engage his or her PTT button and he or she will have the floor. Generally speaking, the PTT system uses standard voice-over Internet protocol (VoIP) technologies. Voice information is sent in digital form over IP-based data networks. In PTT scenarios, instead of using the standard cellular infrastructure a call is formed by combining separate point-to-point connections between each IP endpoint in the network. Initiating the PTT system generates a call to the target device. The call originator's voice can be sent through the carrier's network to the target handset.

A drawback to existing PTT services is that they typically require devices with dedicated PTT hardware components, such as a hardware PTT button, meaning that these services are generally not available for the majority of mobile devices in use today.

SUMMARY

The various embodiments include methods for managing a group communication session on a wireless communication device, including displaying a quick contact group communication shortcut icon on a home screen of a wireless communication device display, displaying a group communication button in association with the the quick contact group communication shortcut icon on the home screen of the display, detecting a selection of the group communication button by a user on a user interface, and initiating a group communication with a device of a contact associated with the quick contact group communication shortcut icon. Further embodiments may include displaying a locking mechanism in association with the quick contact group communication shortcut icon.

Various embodiments include wireless communication devices including processors configured to perform operations of the embodiment methods disclosed herein. Various embodiments also include wireless communication devices including means for performing functions of the embodiment methods disclosed herein. Various embodiments also include non-transitory processor-readable storage media having stored thereon processor-executable instructions configured to cause a processor to perform operations of the embodiment methods disclosed herein.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
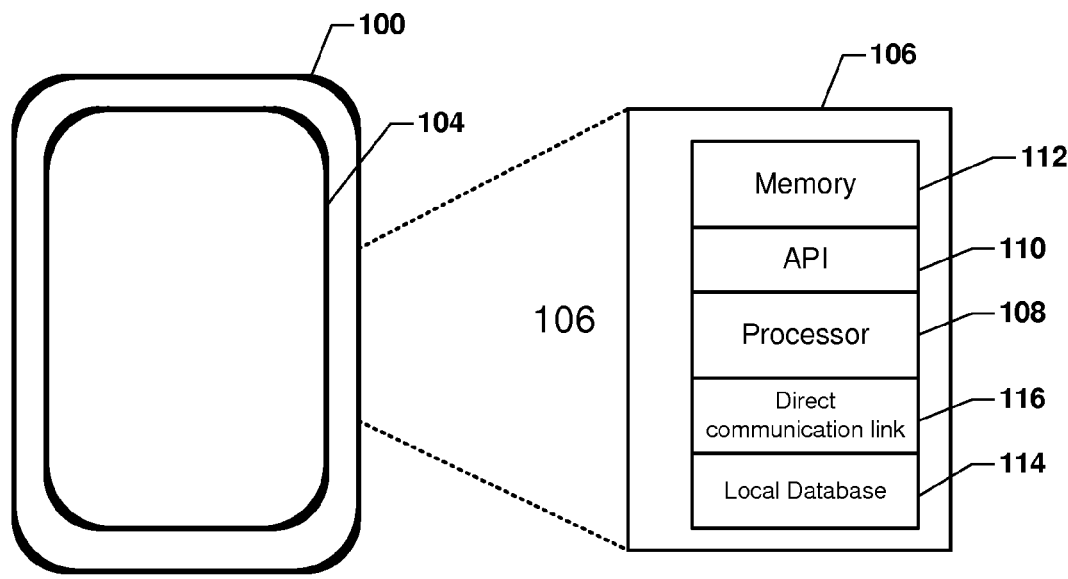
FIG. 1 illustrates a wireless communication device suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "mobile computing device" and "wireless communication device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and memory and may include software and/or hardware to enable group communication, such as push-to-talk (PTT), functionality.

In overview, various embodiments provide enhanced group communication, such as "Push-To-Talk" (PTT), functionality in a wireless communication device using software and native device hardware, such as a touchscreen display. The various embodiments may be implemented on a wide range of devices, including most Internet-enabled mobile phones and other wireless communication devices, and do not require dedicated hardware, such as a PTT button, to provide group communication functionality.

Previously, push-to-talk services required dedicated hardware, such as a PTT button, for the user to take advantage of the service. The various embodiments provide a user-experience that combines many of the advantages of a conventional hardware-based PTT service with a number of enhanced features that are made possible through the use of a group communication service that is primarily implemented through software.

Various embodiments are directed to a novel group communication interface that can provide enhanced functionality as compared to conventional hardware-implemented PTT services. Because the present embodiments are primarily implemented in software, the user no longer needs to "push" a physical button to talk. In various embodiments, the user interface can allow the user to "lock" control of the floor in a hands-free mode, which allows the user to more easily multitask and to utilize the device speakerphone and/or earpiece mode in a more natural way. Additional functionality can also be added, such as the ability to lock control of the floor for media content, as well as the ability to at least temporarily modify the criteria for floor control and mediation, which may be useful when the user desires priority access of the floor for a limited time. The additional functionality may also include the ability to lock out another device in a communication group from receiving outgoing communications from the user's device, as well as the ability to block the user's device from receiving group communications from another user. Some or all of this added functionality may be provided via a target-based sliding lock, which may be implemented in a touchscreen user interface display.

Various embodiments additionally enable the user to create a "quick contact" shortcut on their home screen or as a device widget. Selecting this shortcut brings up a modified PTT "button" on the screen, which may also include the "hands-free" lock, so that the user effectively has the "one-click" PTT experience that is advantageous in conventional hardware-implemented PTT, but on the wider range of devices that may provide a software-implemented group communication service. The quick contact shortcut avoids the issue of the user having to find, launch and navigate through a group communication application program in order to speak to their contact.

Various embodiments may implement a more visual experience than is previously employed, and may utilize visual feedback cues to the user which may augment or replace the existing audio cues for floor control and mediation. The visual feedback cues may be provided via graphical elements and colors on the display screen of the wireless device. In various embodiments, the feedback cues may show the state of a group communication session, and may indicate, for example, control of the floor for group communication. In various embodiments, the display screen may display visual features which tell the user when the floor is open, when the floor is requested by user's device, when the floor controlled by user's device or by a different device. In some embodiments, the display screen may also display visual representations of the members of the group in the group communication, and may further display the participation state(s) of each member of the group. For example, the device may display the members of the group who are currently participating in the group communication session as well as the members of the group who are not participating in the group communication session. In various embodiments, the device may additionally display reasons why the non-participating members are not participating in the communication. These enhanced features may be implemented in software which runs on the user's wireless device, and may also be implemented in part in a server.

Referring now to FIG. 1, it illustrates an example wireless telecommunication device that can be a wireless communication device 100 that includes software and/or hardware to provide a group communication (e.g. "Push-To-Talk" (PTT)) function that opens the direct communication to a target device, e.g., an endpoint associated with an IP address. In various embodiments, the wireless communication device 100 provides group communication functionality using only software and existing device hardware (e.g., a conventional user interface/display, such as a keypad or touchscreen interface). The embodiment device 100 of FIG. 1 is shown having a touchscreen interface/display 104. In various embodiments, no dedicated PTT hardware, such as a PTT button or dedicated PTT circuitry is required to provide the PTT functionality.

In various embodiments, the wireless communication device 100 may include a computer platform 106 that can handle voice and data packets, execute software applications, and transmit information across a wireless network. The computer platform 106 includes, among other components, a processor 108 such as an application-specific integrated circuit ("ASIC") or a RISC processor such as those that implement the ARM architecture. The processor 108 is typically installed at the time of manufacture of the wireless communication device 100 and is not normally upgradeable. The processor 108 or other processor executes an application programming interface ("API") layer 110, which includes the resident application environment, and may include the operating system loaded on the processor 108. The resident application environment interfaces with any resident programs in the memory 112, e.g., a computer readable storage medium of the wireless communication device 100.

As shown here, the wireless communication device 100 may be a wireless communication telephone, with a graphics display 104, but may also be any wireless device with a computer platform 106 as known in the art, such as a personal digital assistant (PDA), a pager with a graphics display 104, or even a separate computer platform 106 that has a wireless communication portal, and may otherwise have a wired connection to a network or the Internet. Further, the memory 112 may be comprised of read-only or random-access memory (RAM and ROM), EPROM, EEPROM, flash cards, or any memory common to computer platforms. The computer platform 106 may also include a local database 114 for storage of software applications not actively used in memory 112. The local database 114 is typically comprised of one or more flash memory cells, but may be any secondary or tertiary storage device as known in the art, such as magnetic media, EPROM, EEPROM, optical media, tape, or soft or hard disk. The graphics display 104 may present not only information about the ongoing group call, but also the information about the data package in order to generate a preview as is more fully described herein.

The computer platform 106 may also include a direct communication interface 116 that is configured to open a direct communication channel. The direct communication interface 116 may also be part of the standard communication interface for the wireless communication device 100 which ordinarily carries the voice and data transmitted to and from the wireless communication device 100. The direct communication interface 116 typically is comprised of hardware as is known in the art.

Figure 2:
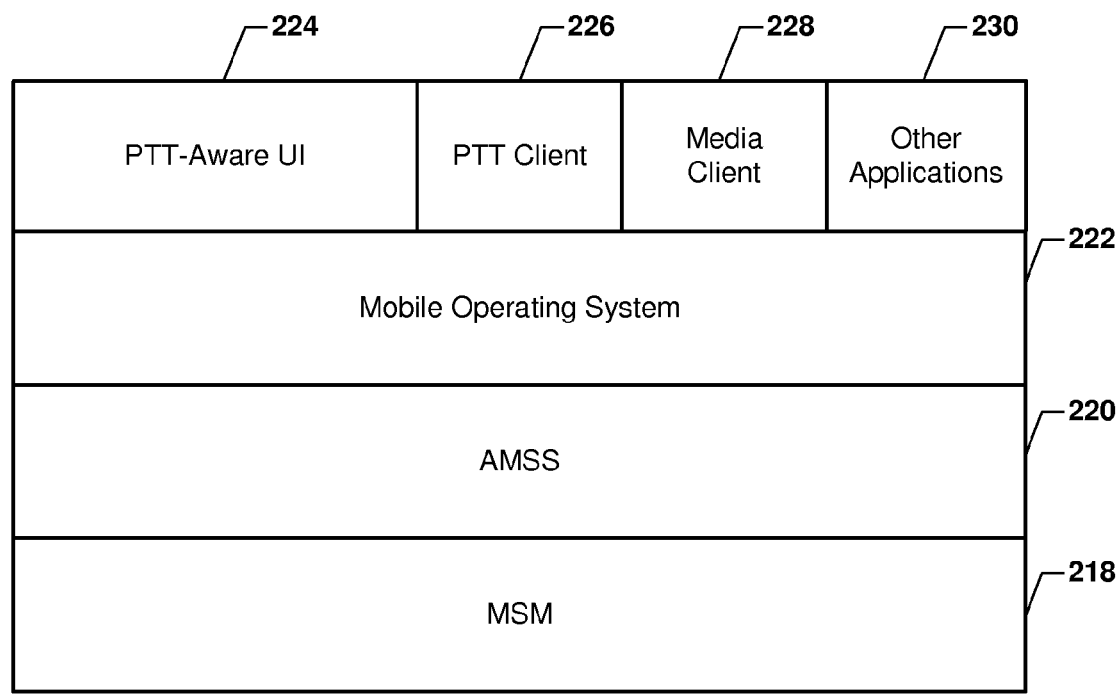
FIG. 2 is a diagram illustrating software layers of a group application client that may include "Push To Talk" (PTT) functionality.

FIG. 2 is a diagram of an embodiment of software layers of a group application client that can include, but is not limited to, PTT functionality and data package functionality. While the embodiment shown herein is implemented in a PTT session, the present system can be utilized in any group communication session setup for transmission of voice and/or data substantially simultaneously among group members. In an embodiment, the computer platform 106 in the wireless communication device environment may include a series of software "layers" developed on top of a baseband chipset and system software such as the Wireless communication Station Modem (MSM) 218 and the Advanced Wireless communication Subscriber Software (AMSS) 220, developed by QUALCOMM®. In this example, the underlying MSM chipset may implement the software protocol stack for the entire suite of CDMA communication technologies that include CDMA2000 1× and CDMA2000 1×EV-DO. In this example the AMSS 220 may be configured to support a wireless communication operating system layer 222, which in an embodiment is BREW® also developed by QUALCOMM®. The wireless communication operating system layer 222 may provide an application programming interface for chip or device-specific operations, while providing an isolation layer that eliminates direct contact to the AMSS 220 and any OEM software on the computer platform. The wireless communication operating system layer 222 may enable application development that uses wireless communication device features without having to rewrite the application each time a new release of the device-specific software is released.

In this example the wireless communication operating system 222 may include a PTT client 226 that is configured to offer access to PTT services through an external interface, here shown at a PTT-aware UI 224. The PTT client 226 may include all the functions required to enable wireless communication operating system 222 applications, such as the media client 228. In an embodiment, the PTT client 226 may maintain access to PTT services, respond to communication requests, process all PTT-aware wireless communication operating system applications requests for PTT services, process all outgoing PTT requests, collect and package vocoder packets for originating PTT talk spurts, and parses packets of vocoder data for terminated PTT talk spurts.

In various embodiments, the computer platform 106 in the wireless communication device environment may include a media client 228, which may be a wireless communication operating system-based application that extends PTT services for access to media types other than the traditional half duplex voice communications (VoIP-PTT media). The media client 228 may provide access to media services through an external interface such as a media aware API that is an application that may be developed entirely as a wireless communication operating system-based application or used in combination with an AMSS 220 interface. The media client 228 may service requests from the user and inform the user of the result of any group-directed media request. The media client 228 may additionally be configured to handle incoming notifications that indicate there is data package to download from a media server 316 of FIG. 3 and described in more detail below. For example, the media client 228 may be configured in one embodiment to download data packages immediately or in other embodiments the media client 228 may be configured to download the data package at a predetermined time period, e.g., at 10:00 pm daily, or it may be configured to prompt the user via the PTT UI 224 to determine whether and/or when to download the file. Other applications 230, which may be push-to-talk or other applications than can receive and transmit data across the group communication channel, may also be resident on the platform.

In some embodiments, the software to enable PTT functionality in the wireless communication device 100 may be pre-installed in the device during device manufacture. In other embodiments, at least a portion of the software providing PTT functionality may be downloaded to the device 100 by the end-user. In some embodiments, the PTT software may be a downloadable application (e.g., a mobile app).

Figure 3:
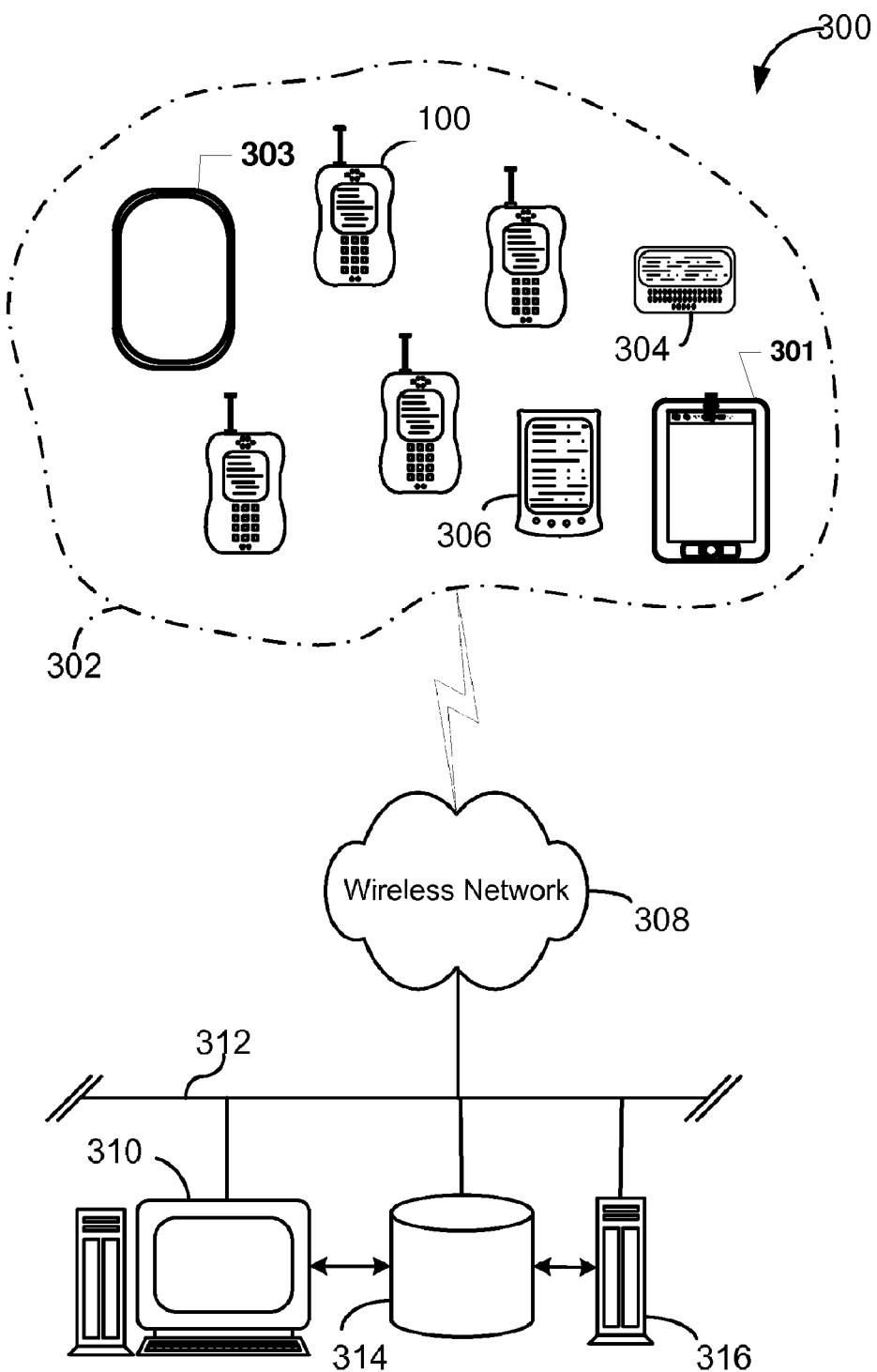
FIG. 3 depicts an example system for group communication between a plurality of wireless communication devices.

FIG. 3 illustrates an example embodiment of a system 300 for sharing data packages among one or more wireless telecommunication devices in a PTT group 302, such as the wireless communication device 100, smartphone 301, tablet computer 303, smart pager 304 and personal digital assistant (PDA) 306, with other wireless communication devices. In the system 300, each wireless telecommunication device 100, 301, 303, 304, and 306 may be capable of selectively directly communicating across the wireless communication network 308 with a target set of one or more other wireless telecommunication devices. For example, the target set for wireless communication device 100 may be all devices in the communication group 302 or a subset thereof, such as smartphone 301, tablet computer 303, pager 304 and PDA 306.

In an embodiment, the wireless telecommunication device 100 may send a flag to at least the communications server 310, which is present on a server-side LAN 312 across the wireless network 308. The flag in this example may be used by the server to determine that the wireless device is present, i.e. is accessible, on the wireless network 308. The communication server 310 may share this information with a set of target wireless telecommunication devices designated by the first wireless telecommunication device or it may also share this with other computer devices resident on the server-side LAN 312 or accessible across the wireless network 308. The communication server 310 may have an attached or accessible database 314 to store the group identification data for the wireless devices. In various embodiments, a media server 316, which may additionally include circuitry for a file management server, may be present on the server-side LAN 312. It should be appreciated that the number of computer components resident on server-side LAN 312, or across the wireless network 308, or Internet generally, are not limited. Furthermore, some or all of the functions of the several server-side components described herein, such as communications server 310, database 314 and media server 316, may be combined in a single device.

In various embodiments, the communications server 310, which may also be referred to as a group communications server, may establish point to point IP PTT channels between devices in the group 302. A PTT channel may be established through a half-duplex channel (true or virtual) between the communicating wireless communication device 100, 304, and/or 306 and the one or more other wireless communication devices of the target set. Also, in various embodiments the communication server 310 may attempt to bridge the requested direct communication with the target set if at least one of the wireless communication devices of the target set have informed the communication server 310 of their presence on the wireless network 308.

The communications server 310 may also inform the wireless communication device 100, 304, and 306 of the inability to bridge a direct communication to the target set 302 upon none of the wireless telecommunication devices (or at least one) of the target set not having informed the group communication server 310 of their presence on the wireless network 308. Further, while the communications server 310 is shown here as having the attached database 314 of group identification data, the group communication server 310 device may have group identity data resident thereupon, and perform all storage functions described herein.

In various embodiments, the communication server 310 may perform arbitration functions between competing demands of the various wireless communication devices 100, 304, 306 for use of PTT communication channels over wireless network 308. For example, in response to a request from wireless communication device 100 to communicate with one or more other target devices in PTT group 302, including all other devices in the group 302, the communication server 310 may establish a PTT channel between the requesting device 100 and all or a portion of the requested target devices in group 302. The communication server 310 may thus grant control of the "floor" to the requesting wireless communication device 100. When competing requests exist amongst devices of the group 302 for control of the "floor," the communication server 310 may arbitrate between competing requests based on pre-determined priority criteria. The priority criteria may be established at the time of the PTT group 302 formation, such as by a group administrator, and stored in communication server 310 and/or database 314. In various embodiments, the priority criteria may be default priority criteria stored in server 301 and/or database 314. In some embodiments, the priority criteria may be established on an ad hoc basis by one or more of the wireless communication devices 100, 304, 306 in the PTT group 302.

In overview, the system 300 may include at least one wireless communication device, such as wireless communication device 100, that may be a member of a PTT communication group 302 of wireless communication devices. The wireless communication devices in this example may be configured to communicate with each other or communicate as a group across a wireless communication network 308. In addition, in various embodiments at least one of the wireless communication devices may be configured to selectively send data packages to other members of the communication group 302. At least one communications server 310 may be configured to store information on communication groups 302 on the wireless communication network 308, the information including the identity of the specific member wireless communication devices of one or more communication groups. The communications server 310 may be further configured to selectively receive data packages from a sending wireless communication device, such as wireless communication device 100, of a communication group 302.

In various embodiments, the media server 316 may be configured to receive the data packages from the wireless communication device (such as wireless communication device 100) and selectively permit members of the communication group 302 to access the stored data packages across the wireless communication network 308. In an embodiment data packages may include, but are not limited to, pictures in JPEG, TIF, and the like, audio files such as MP3, MP4, WAV, and the like, documents, and/or presentations. The data packages may additionally include streaming media, such as a multimedia application (PowerPoint, MOV file, and the like). Also, the data packages may include half-duplex video conferencing among members of the communication group wherein the picture of the speaker may be broadcast to the other group members in substantial real-time, or in delay.

The size of the data package files can be very large and because of the potential delay of sending the media, or inability of the receiving wireless communication device to handle the sent media, the system 300 may use a media server 316 to store the data packages such that target members of the communication group 302 can selectively access the stored media without interrupting other PTT communications. Alternatively, in one embodiment, if the data packages are stored at the media server 316, the media server 316 may be configured to send a hypertext link to the originating device or the target wireless communication devices of the communication group 302. The hypertext link in this example may provide a link to the stored group-directed media at the media server 316. Upon receipt of data packages by at least one of the member wireless devices of the communication group 302, the communications server 310 may send an acknowledgement indicating to the wireless communication device 100, 304, and 306 that at least one member wireless communication device of the communication group 302 received the data package.

The wireless communication device 100, 304, 306 may send communication group identification data to the communications server 310 at the time of sending a data package, e.g. a target list, and thus, the media server 316 may be configured to send or store the data package to or for the member wireless communication devices identified in the communication group identification data based upon a variety of criteria. Alternately, prior to the wireless communication device sending data packages, the wireless communication device 100, 304, and 306 may request member data for a communication group 302 from the communications server 310, and the server 310 may send one or more addresses or communication group addresses to the wireless communication device 100, 304, and 306. In an embodiment, the communications server 310 may filter the potential communication groups available based upon their member devices' capability to receive data packages.

As is further described herein, the wireless communication device 100, 304, and 306 may be engaged in a group communication with the member wireless communication devices of the communication group 302, and send data packages during the group communication in the same communication session, either to all members or a subset thereof. Alternately, the data packages may be sent independently of the group-communication session.

Figure 4:
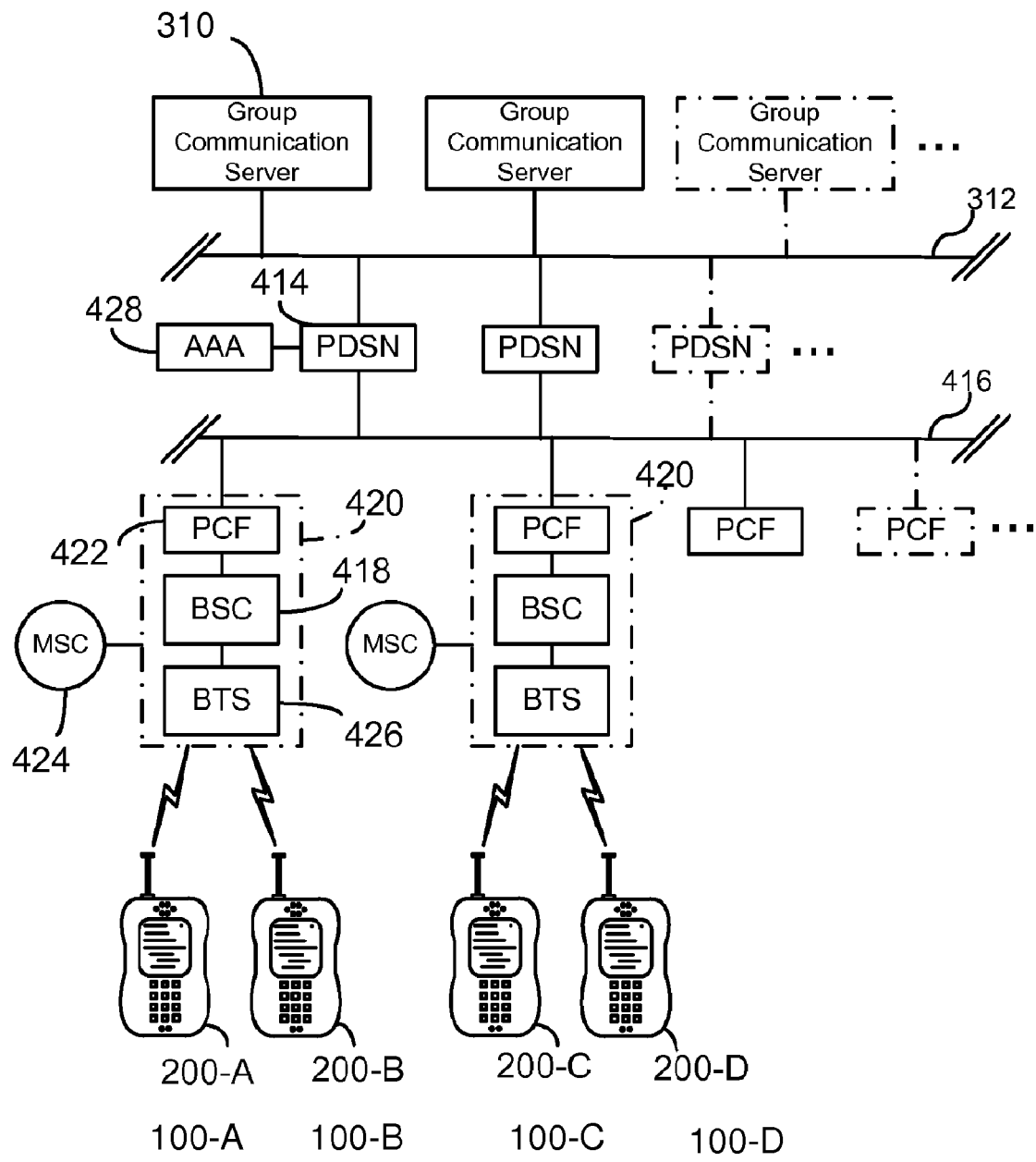
FIG. 4 shows an example wireless network suitable for use with various embodiments.

FIG. 4 shows an exemplary wireless network in a common cellular telecommunication configuration. The wireless network in this example includes a series of communications servers 310 that control communications between the wireless communication devices of set group members (devices 100-A through D) in a PTT system. The wireless network is merely exemplary and can include any system whereby remote modules communicate over-the-air between and among each other and/or between and among components of a wireless network, including, without limitation, wireless network carriers and/or servers. A series of communications servers 310 may be connected to a group communication server LAN 312. Wireless devices 100-A through D may request voice (e.g., VoIP) and/or packet data sessions from the group communications server(s) 310.

Continuing with the description of FIG. 4, the communications server(s) 310 in this example may be connected to a wireless service provider's packet data service node (PDSN) such as PDSN 414, shown here resident on a carrier network 416. When a wireless communication device accesses the wireless data network to obtain services, the PDSN 414 may interface with an authentication, authorization, and accounting server "AAA" 428 to authenticate the wireless communication devices 100, 304, and/or 306. The AAA 428 may be coupled to a database operable to store information such as user accounts and privileges. Each PDSN 414 may interface with a base station controller 418 of a base station 320 through a packet control function (PCF) 422. The PCF 422 may be located in the base station 420. The wireless network 308 may control messages (generally in the form of data packets) sent to a messaging service controller ("MSC") 424. The carrier network 308 in this example may communicate with the MSC 424 by a network, the Internet and/or POTS ("plain ordinary telephone system"). Typically, the network or Internet connection between the wireless network 308 and the MSC 424 transfers data, and the POTS transfers voice information. The MSC 424 may be connected to one or more base stations 420. In a similar manner to the carrier network, the MSC 424 is typically connected to the branch-to-source (BTS) 426 by both the network and/or Internet for data transfer and POTS for voice information. The BTS 426 ultimately broadcasts and receives messages wirelessly to and from the wireless devices, such as devices 100-A through D, which may be cellular telephones, by short messaging service ("SMS"), or other over-the-air methods known in the art. It should also be noted that carrier boundaries and/or PTT operator network boundaries do not inhibit or prohibit the sharing of data as described herein.

Wireless communication telecommunication devices, such as mobile or wireless telephones, are being manufactured with increased computing capabilities and are becoming tantamount to personal computers and hand-held PDAs. These "smart" cellular telephones allow software developers to create software applications that are downloadable and executable on the processor of the wireless device. The wireless device, such as device 100, can download many types of "data packages," which are discrete segments of computer code, such as applications, web pages, applets, MIDlets, multimedia, picture, games and simple data. In wireless devices that have designated a communication group 302 (such as depicted by FIG. 3), the wireless communication device may directly connect with the other member of the set and engage in voice and data communication. However, in various embodiments, such direct group communications may occur through, or at the control of, the group communication server 310. All data packets of the devices do not necessarily have to travel through the communication server 310 itself, but in various embodiments the communication server 310 is preferably able to ultimately control the communication because it is typically the only server-side component that is aware of and/or can retrieve the identity of the members of the communication group, or direct the identity of the members of the communication group 302 to another computer device.

Figure 5:
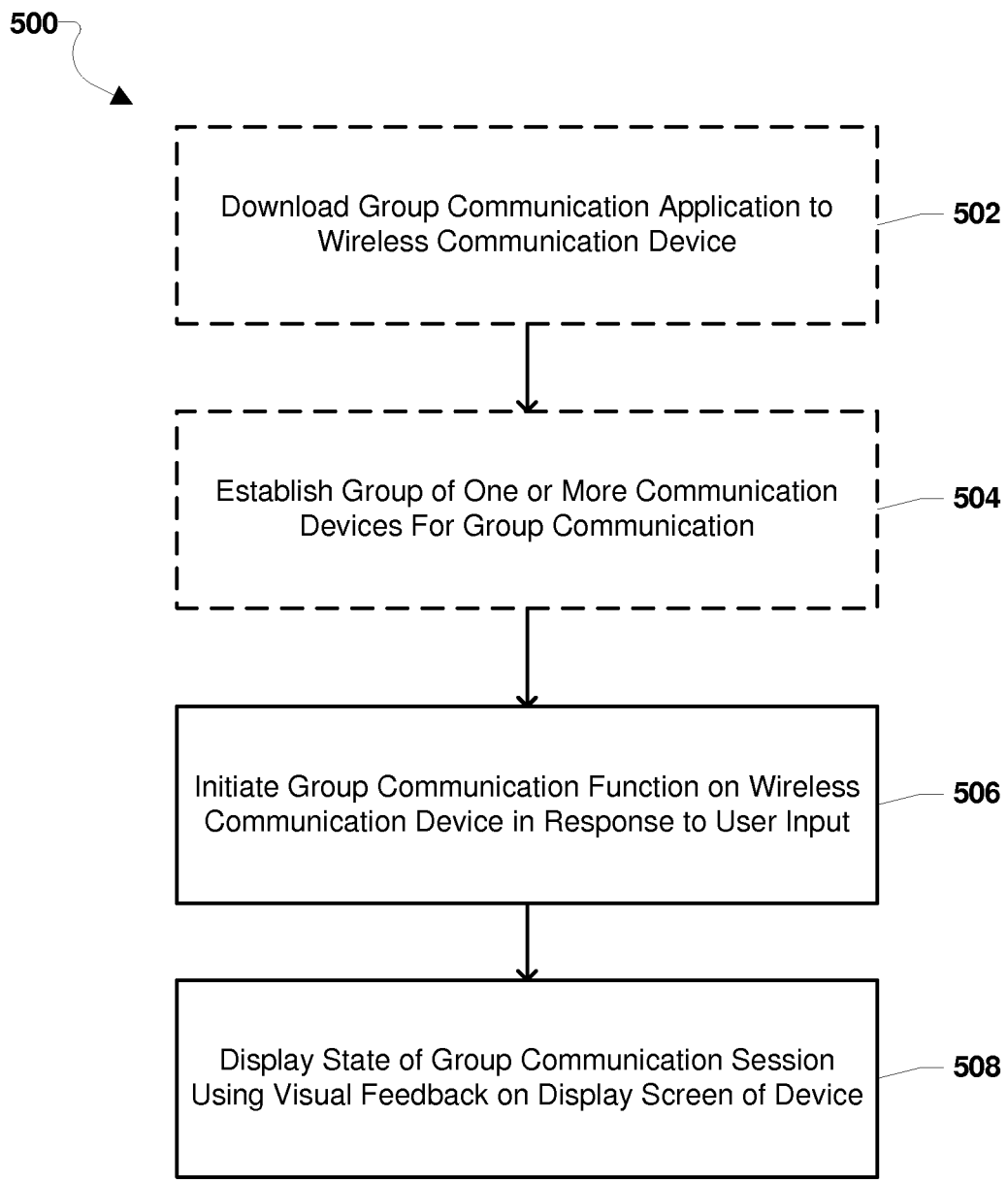
FIG. 5 is a process flow diagram of an embodiment method of group communication in which visual feedback regarding the state of the group communication session is displayed on a display screen of a wireless communication device.
Figure 6A:
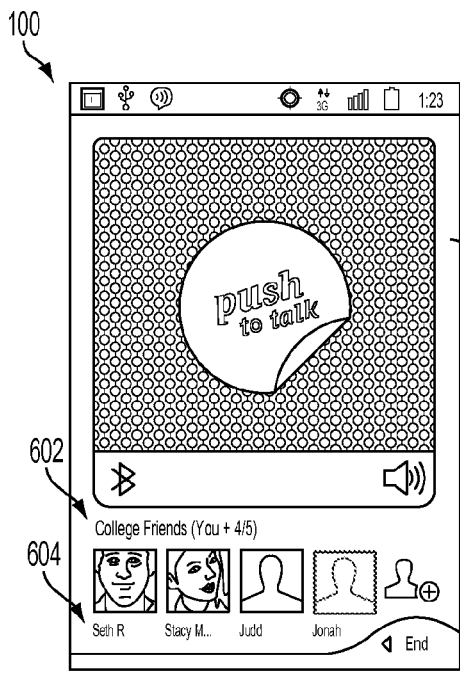
FIGS. 6A-6C are screenshots of a touchscreen user interface of an embodiment wireless communication device.
Figure 6B:
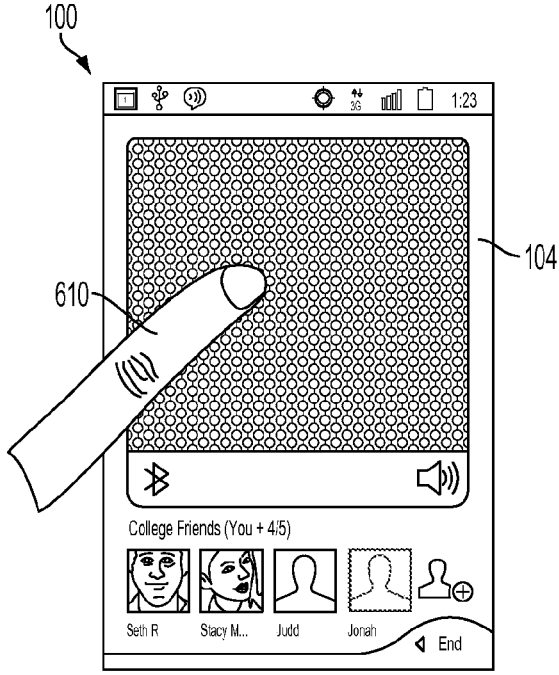
Figure 6C:
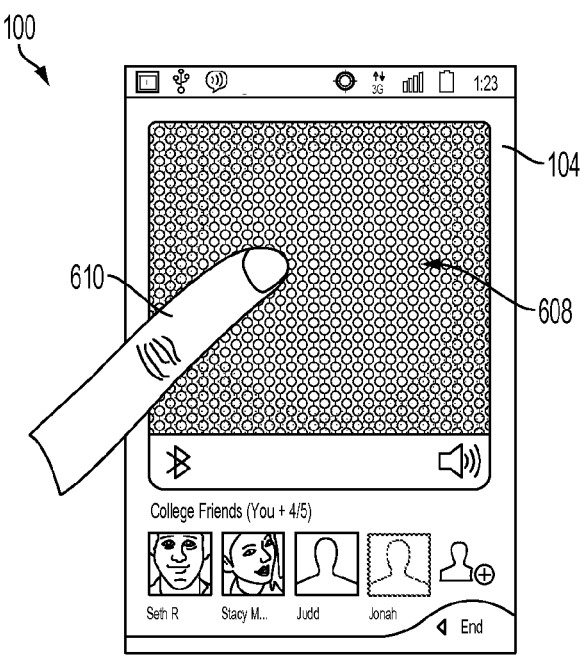

FIG. 5 is a process flow diagram illustrating an embodiment method 500 of communicating over a wireless network using a wireless communication device with group communication functionality, such as "Push-To-Talk" (PTT) functionality. The various embodiment methods may be described herein as utilizing a "Push-To-Talk" function, though it will be understood that the embodiment methods may be applicable to other types of group communication. FIGS. 6A-6C are screenshots of a touchscreen user interface 104 of an exemplary wireless communication device 100 suitable for practicing the method 500 according to one embodiment. In various embodiments, the wireless communication device 100 provides group communication, such as PTT communication, using software and native device hardware, such as a touchscreen display 104 and/or other user interfaces, such as a keypad interface. In various embodiments, the PTT methods described herein may be implemented on a wide range of devices, including most Internet-enabled mobile phones and other wireless communication devices. In various embodiments, the methods may be implemented using wireless communication devices that do not include dedicated PTT hardware, such as a PTT button or PTT-specific circuitry.

As shown in method 500, the wireless communication device 100 may download group communication application software, such as PTT application software, in optional block 502. The group communication application software may include all or a portion of group communication client software, such as described above in connection with FIGS. 1 and 2. In various embodiments, a downloadable version of the group communication application software allows devices which are capable of supporting group communication to download and run the group communication application to provide the wireless device with group communication functionality. In other embodiments, the wireless device 100 may have factory-installed group communication application software, in which case the optional block 502 may not be performed.

The wireless communication device 100 may establish a group of one or more other wireless communication devices for group communication (e.g., a "group communication group") in optional bock 504. It will be understood that a group communication group may include one other device. A group communication group may also comprise a plurality of other devices to enable "multi-cast" or "broadcast" communication with the plurality of devices over a wireless network using the group communication function. As shown in FIGS. 6A-C, for example, a group communication group ("College Friends") has been established which includes six devices, the user's own wireless device 100 and five other devices.

In various embodiments, the group communication group may be established by the user or users of the various wireless devices, for example, in an ad hoc process. The establishment of a group communication group may be performed through or under the control of a server, such as communication group server 310 as described above in connection with FIGS. 3 and 4. It will be understood that a plurality of different group communication groups may be established, and a single wireless communication device 100 may be included in a plurality of different group communication groups, and may communicate with devices of any one of the groups using the group communication function. In some embodiments, one or more group communication groups may be previously established on the wireless communication device 100, such as by a system administrator, in which case the optional block 504 may not be performed.

In block 506, the wireless communication device 100 may initiate the group communication function in response to input from the user of the device 100. For example, the user may select from a menu and launch a group communication application on the wireless device 100 using a suitable user interface, such as the touchscreen display 104 of FIGS. 6A-C. The initiation of the group communication function may also include the selection of a group communication group with which to establish a group communication session, wherein the group communication group may consist of one or more wireless communication devices.

In block 508, the wireless communication device 100 may display the state of the group communication session using visual feedback on the display screen 104 of the device 100. As described in further detail below, the display screen 104, which in various embodiments consists of a touchscreen, may display visual feedback cues, including graphical elements and/or colors, to indicate the various states of the group communication session, such as floor status (i.e., floor open, floor granted, etc.), the status of other group member(s), the existence of long connection times, etc.

Referring to the exemplary embodiments of a touchscreen display 104 shown in FIGS. 6A-6B, in FIG. 6A is shown a touchscreen display 104 in which a group communication application, specifically a PTT application, has been initiated. The display 104 identifies a group 602 with which a PTT communication session has been established, and further displays a plurality of icons 604 representing the individual members of the group 602. A virtual PTT button 606 is displayed on the screen 104. In various embodiments, a virtual PTT button 606 may function much like a conventional hardware PTT button. When the device 100 detects a touch event on the virtual button 606, the device 100 may transmit a request to the communication server 310 to open a communication channel from the wireless device 100 to the other device(s) in the PTT group. FIG. 6B illustrates an exemplary embodiment of a display 104 which shows a neutral state of the PTT session, in which the PTT session has been initiated, such as by the user's finger 610 touching the virtual PTT button 606, but no communication channel is currently established (i.e., the "floor" is open). FIG. 6C illustrates the display 104 where the user's finger 610 is touching the virtual button and a communication channel from the wireless device 100 to other devices in the group is established and open (i.e., the "floor" has been granted to the wireless communication device 100). In this state, the wireless communication device 100 may transmit voice and/or other data across wireless network to the other device(s) in the PTT group. As shown in FIG. 6C, this state (i.e., floor granted to device 100) may be indicated by a change in color over a portion 608 of the display 104.

Figure 7:
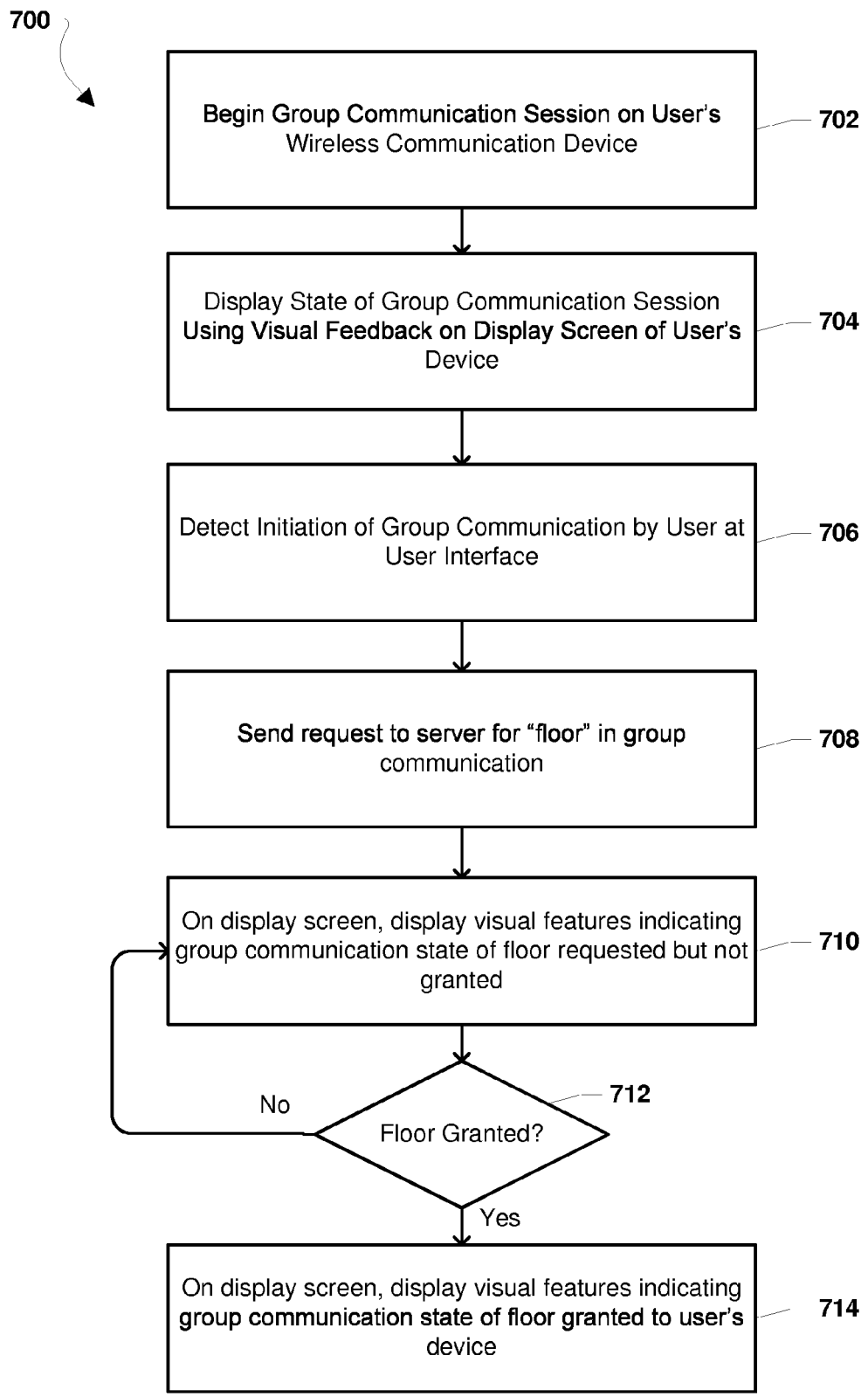
FIG. 7 is a process flow diagram of an embodiment method of group communication that includes displaying visual feedback to indicate control of the floor in a PTT communication session.

FIG. 7 is a process flow diagram illustrating an embodiment method 700 of group communication, such as PTT communication, using visual feedback of the state of the group communication session. In block 702, the wireless communication device 100 may begin a group communication session as described above. In block 704, the device 100 may display the state of the group communication session using visual feedback on a display screen 104, which may be a touchscreen display. In block 706, the device 100 may detect the initiation of a group communication by the user on the user interface of the device 100. In various embodiments, this may include the detection of a touch event at a "virtual" PTT button, such as described above in connection with FIG. 6A. In other embodiments, such as in devices without a touchscreen interface, this may include the detection of a key entry on a keypad interface. In block 708, the device 100 may send a request to a server, such as communication server 310 described above, for the "floor" for a group communication. In block 710, the device 100 may display visual feature(s) indicating a group communication state of floor requested but not granted. In various embodiments, the visual features for this state may correspond to the "neutral" state shown in FIG. 6B. In other embodiments, this state could be indicated by color coding, such as a red or yellow screen when the floor has been requested but not granted, which can change to a different color, such as green, when the device 100 is granted the floor. While the floor is requested but not yet granted (i.e., determination block 712=No), the device 100 may continue to display visual features indicative of this state. When the floor is granted (i.e., determination block 712=Yes), the device 100 may display visual features indicating that the floor is granted to the user's device 100. As discussed above, these visual features may include a change in color of all or a portion of the display screen 104 (such as from red or yellow to green), or it may include the display of other graphical feedback cues. It will be understood that in addition to the visual feedback cues described herein, other feedback cues, such as audio or haptic cues, can also be employed to indicate the state of the group communication.

Figure 8C:
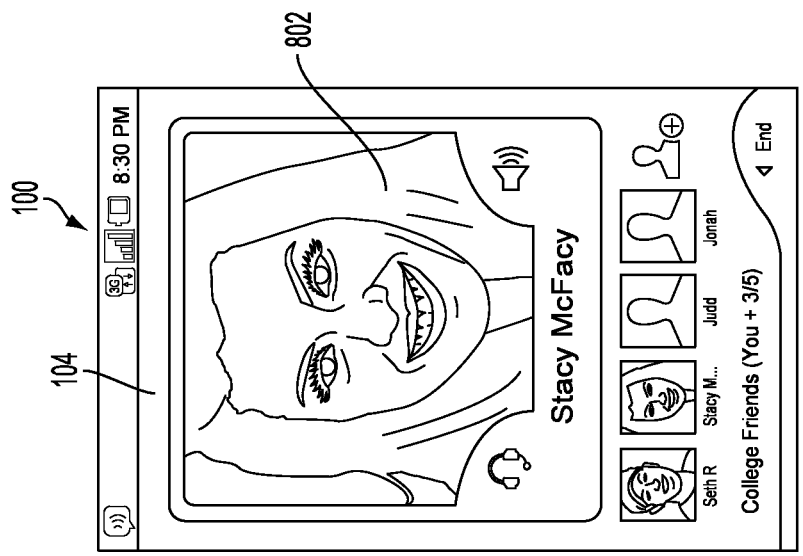
FIGS. 8A-C are screenshots of a touchscreen display illustrating an embodiment PTT communication session.
Figure 8B:
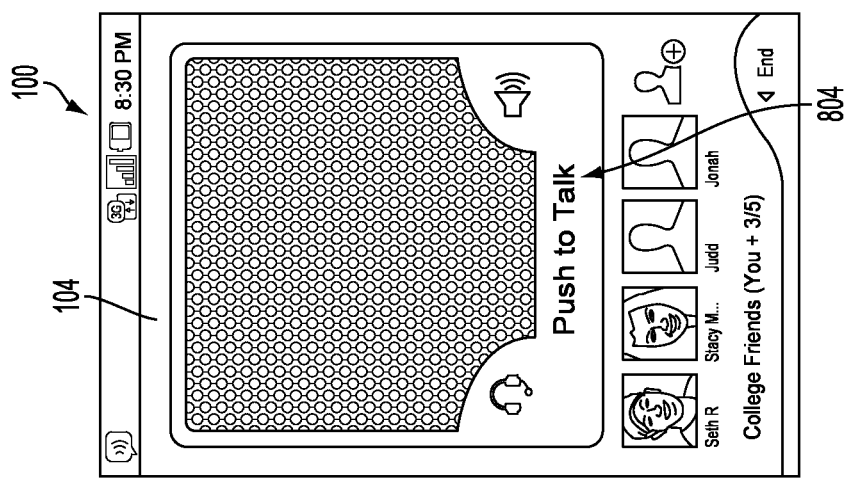
Figure 8A:
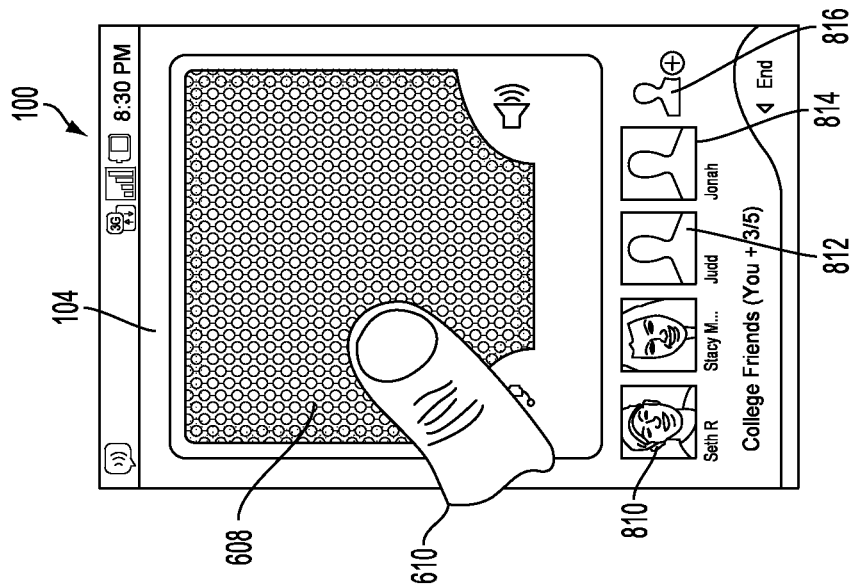

FIGS. 8A-C are further screenshots of a touchscreen display 104 illustrating an embodiment group communication session, specifically a PTT communication session. FIG. 8A shows the screen displaying visual features indicating that the floor is granted to the user's device 100, as discussed above in connection with FIG. 6C. In this embodiment, the device 100 displays a color change over a portion 608 of the screen when the floor is granted. The user's thumb 610 is shown touching the screen. FIG. 8B shows the screen displaying visual features indicating a neutral state in which the floor is open. In this embodiment, the display 104 may indicate that the floor is open, and that a touch event on the display 104 or on a portion 804 thereof (e.g., "Push to Talk") will cause the device 100 to request control of the floor for a group communication. FIG. 8C shows the screen displaying visual features indicating that another user's device has control of the floor. This state may be indicated by a change in graphics and/or color on the display screen 104. In this embodiment, this state is indicated displaying the contact icon 802 (e.g., photograph) of the user whose device currently controls the floor (e.g., the person speaking) in the group communication session.

Figure 9A:
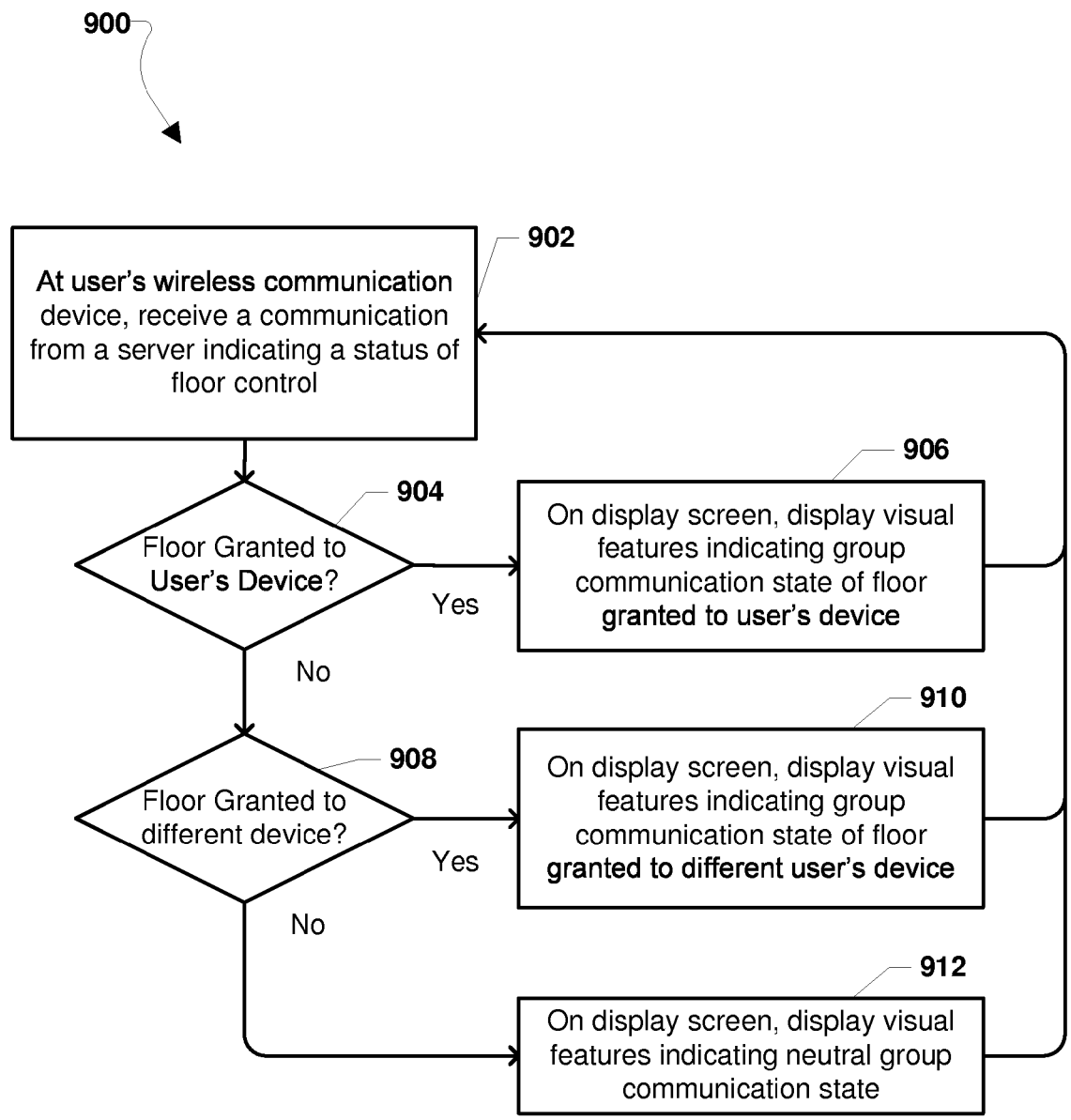
FIG. 9A is a process flow diagram of an embodiment method of group communication that includes displaying visual feedback to indicate the status of the floor in a group communication session.

FIG. 9A is a process flow diagram illustrating an embodiment method 900 of group communication using visual feedback of the state of the group communication session. In block 902, the user's wireless communication device 100 may receive a communication from a server, such as group communication server 310 described above, indicating a status of floor control in a group communication session. When the floor is granted to the user's device (i.e., determination block 904=Yes), then the device 100 may display, on a display screen, visual features indicating a group communication state of floor granted to the user's device 100 in block 906. The visual features may include graphical elements and/or changes in color, as described above. An example of a device screen in a group communication state of floor granted to the user's device according to one embodiment is shown in FIG. 8A. When the floor the floor is controlled another device in the group communication group (i.e., determination block 908=Yes), then the device 100 may display, on the display screen 104, visual features indicating a group communication state that the floor is granted to a different user's device in block 910. The visual features may include graphical elements and/or changes in color, as described above. An example of a device screen in this state is according to one embodiment is shown in FIG. 8C. In this embodiment, the visual feature may include a contact icon of the user whose device controls the floor in the group communication, as shown in FIG. 8C. When the floor is not controlled by the user's device (i.e., determination block 906=No), and the floor is not controlled by any other device in the group communication group (i.e., determination block 908=No), then the device 100 may display, on the display screen 104, visual features indicating a neutral state in which the floor is open in block 912. The visual features may include graphical elements and/or changes in color, as described above. An example of a device screen in a neutral state according to one embodiment is shown in FIG. 8B.

The device 100 may maintain the various visual feedback features corresponding to the group communication state in blocks 906, 910 and 912, respectively, until the device 100 receives a floor status communication from server in block 902, and the above process may repeat.

Figure 9B:
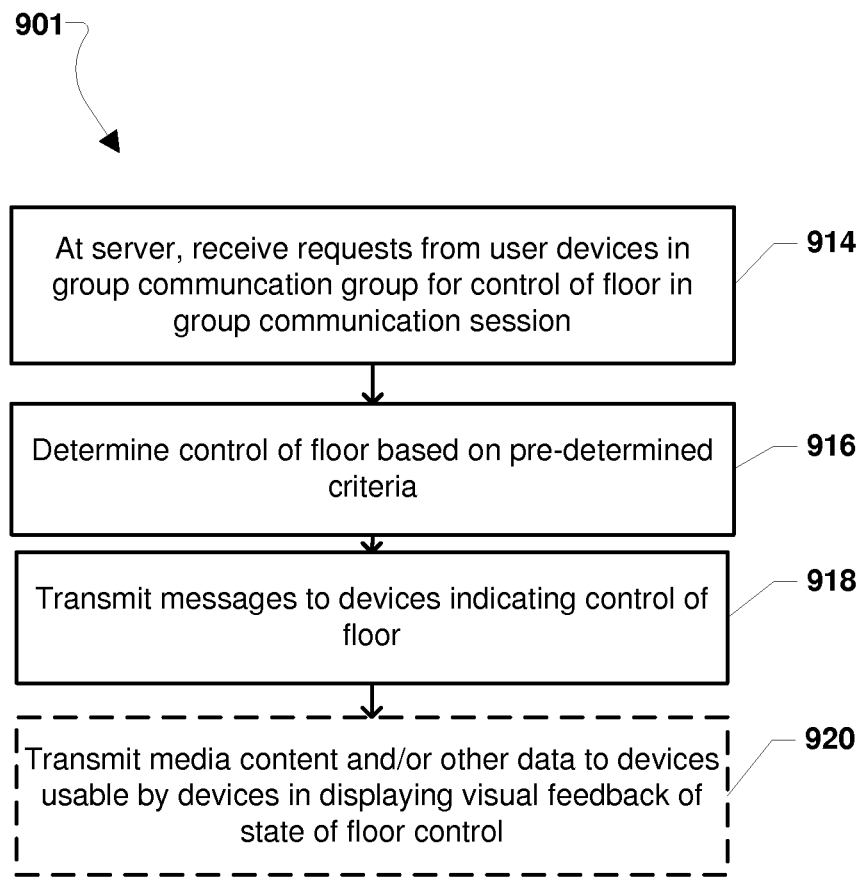
FIG. 9B is a process flow diagram of an embodiment method of group communication using a server that may transmit a state of floor control.

FIG. 9B is a process flow diagram illustrating an embodiment method 901 of group communication using a server, such as group communication server 310 shown in FIGS. 3 and 4. The server 310 may receive requests from user devices in a group communication group for control of the floor in a group communication session in block 914. The server 310 may determine control of the floor based on pre-determined criteria, as discussed above, in block 916. The server 310 may transmit messages to the devices in the group indicating which device has control of the floor in block 918. The server 310 may also transmit media content and/or other data to the devices in optional block 920. This transmitted data may be usable by the devices in displaying visual feedback of the state of floor control in the group communication session. For example, the server 310 may send image file(s) or other information which may be displayed by the devices in the group while a particular device has control of the floor. In various embodiments, the devices may determine whether or not to use the transmitted data in displaying a visual indication of the state of floor control.

Referring again to FIGS. 8A-C, in various embodiments, a wireless communication device 100 can include a display 104 that displays visual feedback of the participation state of one or more devices in a group communication, such as a PTT communication. In various embodiments, the device 100 may display visual feedback that indicates which users from a group are available to participate in a group communication as well as which users from the group are not available. In various embodiments, the device 100 may also display the reason(s) why one or more users are not available to participate in a group communication. As shown in FIG. 8A, the display screen 104 of the device 100 may display an identification of a group 806 with which a group communication session has been initiated, which may include the name of the group (e.g., "College Friends"), the number of members of the group, as well as the group members currently participating in the group communication session (e.g., "You+3/5"). The display screen 104 may also display icons 810, 812, 814 representing each of the members of the group. The display screen 104 may display only a limited number of icons, and may enable the user to scroll through to view additional icons and/or may include a separate icon 816 to enable the user to view the icons of additional group members. The icons may include photographs 810 of the group members when available, and may include a default icon 812 where a photograph is not available. Icon 814 represents a member of the group who is not participating in the group communication session. In various embodiments, icon 814 of a non-participating group member may include different visual characteristics than the icons 810, 812 of participating group members. In the embodiment illustrated in FIG. 8A, for example, icon 814 has a darker color than the other icons 810, 812, and is also partially faded out. Any suitable graphical features can be utilized to indicate the participation state(s) of the various members. In various embodiments, the display 104 can include visual features to indicate the reason for non-participation of one or more group members. In some embodiments, the user may click on the icon 814 of a non-participating member to display the reason for non-participation, such as the member is busy (e.g., on another call), unreachable (e.g., the member's device is out of the coverage area or not enabled for group communication), unavailable (e.g., the user's device is turned off), or is otherwise not participating in the call (e.g., the member has placed his/her device on "mute"). In various embodiments, the user may be able to set the status of his or her wireless device (e.g., "I am in a meeting until 2 pm and unavailable to talk"), and this reason for non-participation may be displayed on the devices of other members of the group.

Figure 10A:
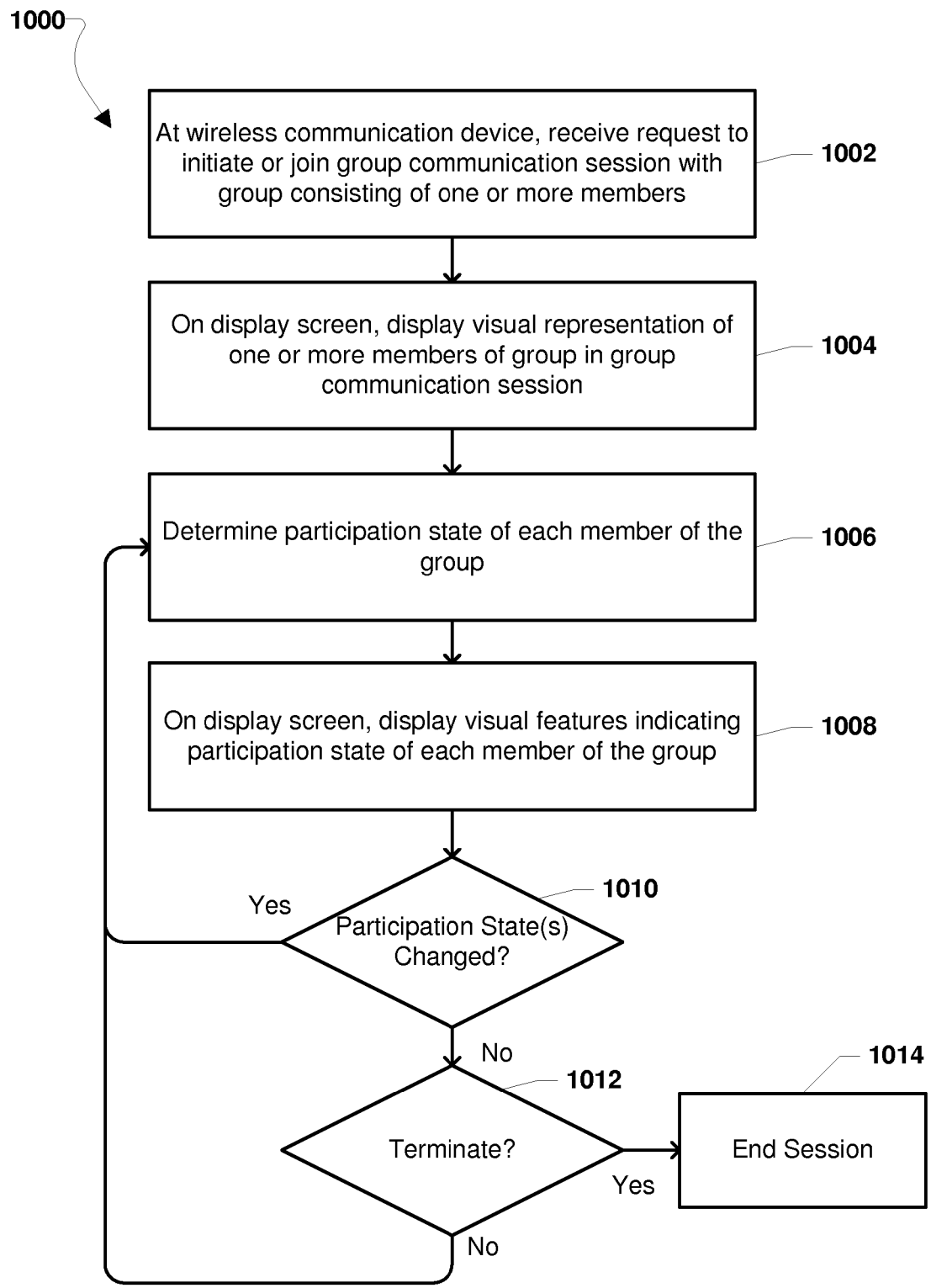
FIG. 10A is a process flow diagram of an embodiment method of group communication that includes displaying visual feedback of the participation state of one or more devices in a communication group.

FIG. 10A is a process flow diagram illustrating an embodiment method 1000 of group communication that includes visual feedback of the participation state of one or more devices in a communication group. In block 1002, a wireless communication device 100 may receive a request to initiate and/or join a group communication session with a group consisting of one or more member devices. The request may be received from the user of the device 100 on a user interface, such as a touchscreen display or a keypad interface. The request may also be received from another device within the communication group, or from a server, such as group communication server 310. In block 1004, the device 100 may display, on a display screen, a visual representation of the one or more members of the communication group. The visual representation of the one or more members may include icons representing each of the members of the group, as shown in FIG. 8A. In various embodiments, the various members of the communication group may be accessed from memory on device 100. In some embodiments, the members of the communication group may be determined via communication with a server, such as group communication server 310, or via communication with one or more other devices on the wireless network. In block 1006, the device 100 may determine a participation state of each member of the group. The determining a participation state may include determining whether each member device is participating or is not participating in the group communication session. In various embodiments, the participation states of the various members may be determined via communication with a server, such as group communication server 310, or via one or more other devices on the wireless network. In block 1008, the device 100 may display visual features indicating the participation state of each of the one or more members of the group. In various embodiments, an icon representing a non-participating group member may include different visual characteristics than the icons of participating group members, such as shown in FIG. 8A. When the participation state of a group member changes (i.e., determination block 1010=Yes), the device 100 may determine the updated participation states in block 1006 and display visual features indicating the updated participation states in block 1008. This may process may continue while the session is active (i.e., determination block 1012=No). The session may be terminated (i.e., determination block 1012=Yes) in block 1014.

Figure 10B:
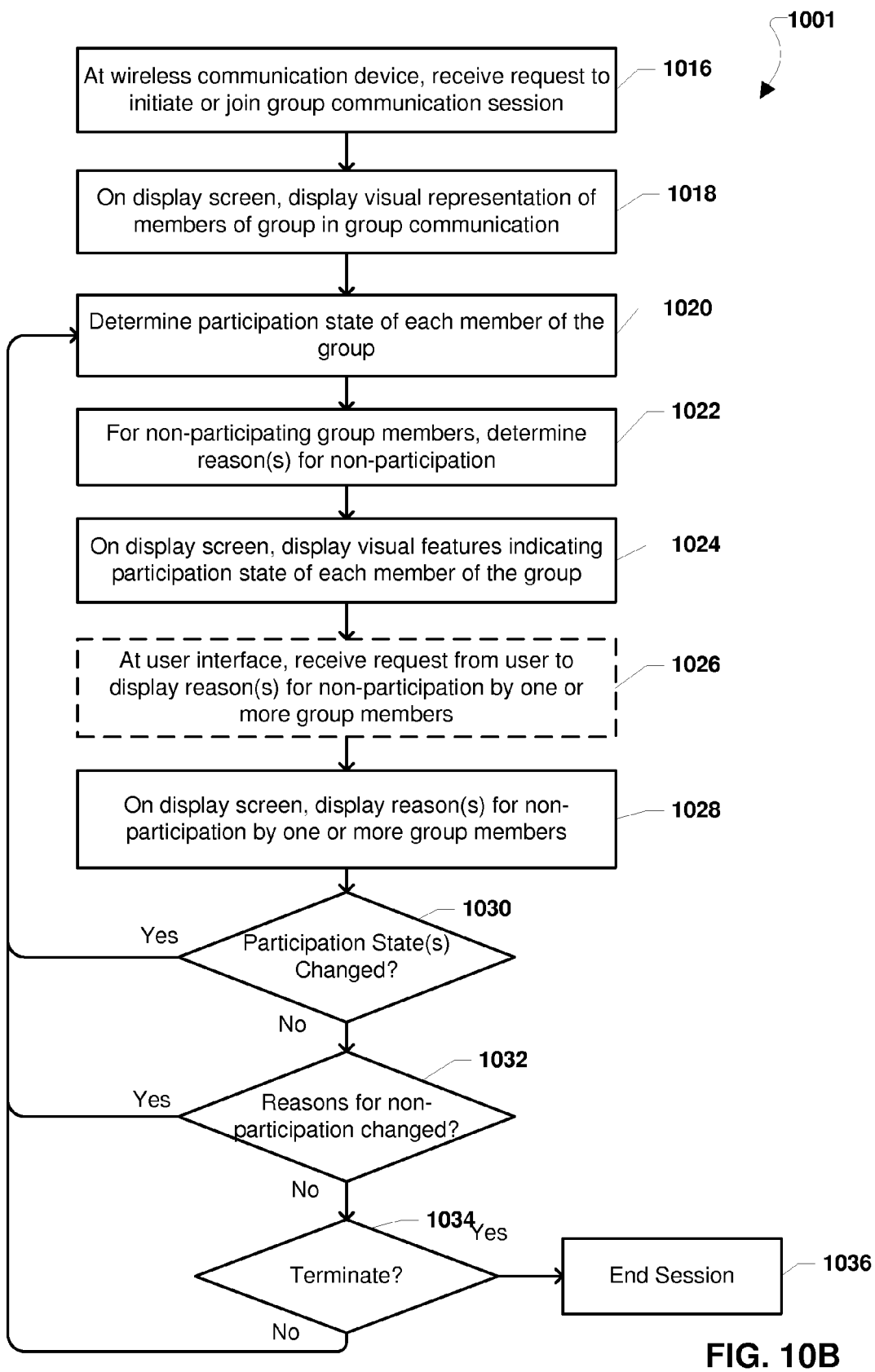
FIG. 10B is a process flow diagram of an embodiment method of group communication that includes displaying visual feedback of the participation state of one or more devices and the reason(s) for non-participation of at least one non-participating device in a communication group.

FIG. 10B is a process flow diagram illustrating an embodiment method 1001 of group communication that includes visual feedback of the participation state of one or more group member devices in a communication group and additionally display of the reason(s) for non-participation in the communication session by one or more non-participating group member devices. Bocks 1016-1020 are similar to blocks 1002-1006 of method 1000 shown in FIG. 1 OA, and include receiving a request to initiate and/or join a group communication session with a group consisting of one or more member devices in block 1016, displaying a visual representation of the one or more members of the communication group at block 1018, and determining a participation state of each member of the group in block 1020. The wireless communication device 100 may determine the reason(s) for non-participation for one or more non-participating group members in block 1022. In various embodiments, the reasons for non-participation may include that the particular member is busy, the member's communication device is unreachable, or the member's device is otherwise unavailable, for example. The user's device 100 may display visual features representing the participation state of each member of the group in block 1024. In various embodiments, the user's device 100 may receive a request from the user on a user interface to display one or more reason(s) for non-participation by the one or more non-participating group members in optional block 1028. The request to display the reason(s) for non-participation may be made by clicking on an icon of a non-participating member, for example. In response to the request, the device 100 may display on a display screen 104 the reason(s) for non-participation in block 1028. In some embodiments, the optional block 1028 may be omitted, and the device 100 may automatically display the one or more reason(s) for non-participation in block 1028. When the participation state of one or more group members changes (i.e., decision block 1030=Yes), then the device 100 may determine an updated participation state in block 1020 and the reason for non-participation by any new non-participating members in block 1022, and may display the updated participation status and reasons for non-participation in blocks 1024 and 1028, respectively. Similarly, where a reason for non-participation of one or more group members changes (i.e., determination block 1032=Yes), then the device 100 may proceed to block 1020 to update the participation state and reasons for non-participation, and display the updated status and reasons at blocks 1024 and 1028. This may continue (i.e., determination block 1034=No) until the group communication session is terminated (i.e., determination block 1034=Yes) in block 1036.

Figure 10C:
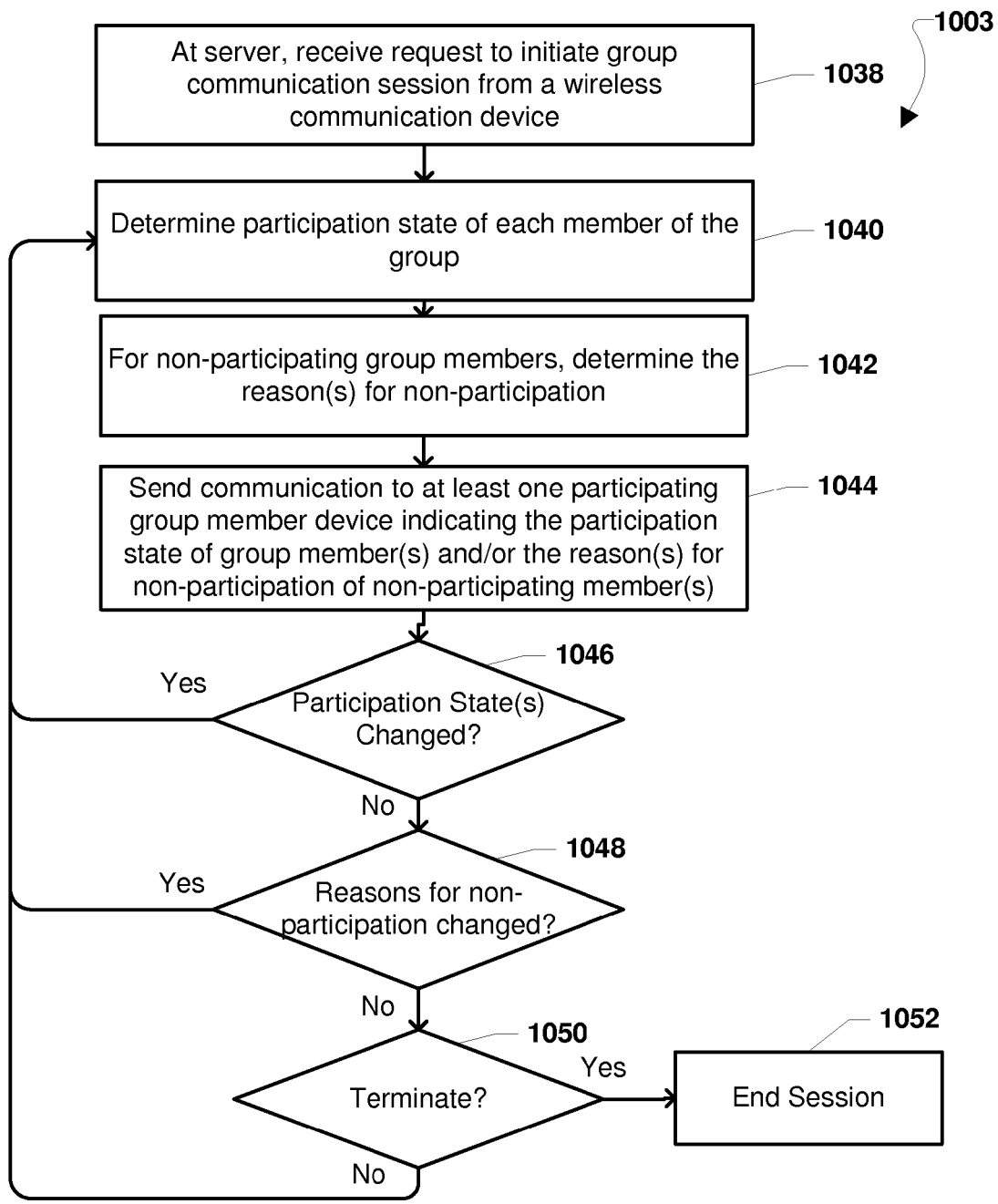
FIG. 10C is a process flow diagram of an embodiment method of group communication using a server that may indicate to devices in the group the participation state and/or reason(s) for non-participation of at least one device in the group.

FIG. 10C is a process flow diagram illustrating an embodiment method 1003 of operation of a server 310 in a group communication session. In some embodiments, the method 1003 of FIG. 10 may be performed in conjunction with method 1000 and/or method 1001 of FIGS. 10A and 10B, respectively. The server 310 may receive a request to initiate a group communication session sent from a wireless communication device in block 1038. The server 310 may determine the participation state of each member of the group in block 1040. For non-participating group members, the server 310 may determine the reason(s) for non-participation in block 1042. The server 310 may send a communication to at least one participating group member device indicating the participation state of at least one other group member and/or the reason(s) for non-participation of at least one non-participating member at block 1044. When the participation state of one or more group members changes (i.e., decision block 1046=Yes), or when a reason for non-participation changes (i.e., decision block 1048=Yes), then the server 310 may proceed to block 1020 to determine the updated participation states and reasons in block 1022, and may send a communication to at least one participating group member to update the participation status and/or reasons for non-participation in block 1044. This may continue (i.e., determination block 1050=No) until the group communication session is terminated (i.e., determination block 1050=Yes) in block 1052.

Figure 11A:
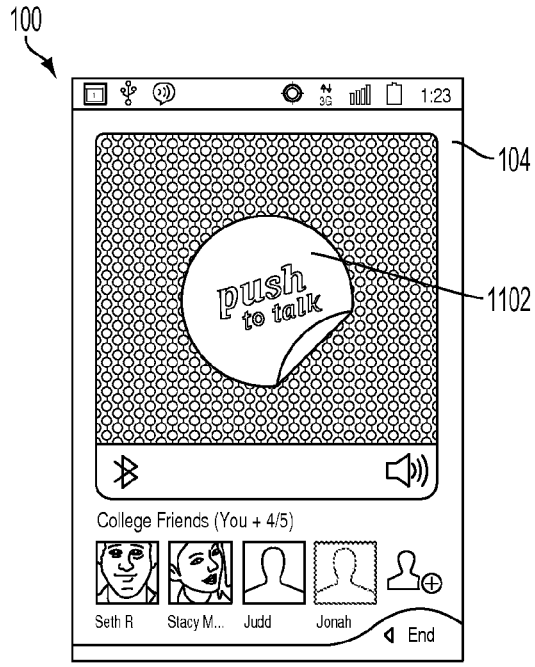
FIGS. 11A-11D are screenshots of an embodiment touchscreen display having a sliding lock mechanism.
Figure 11B:
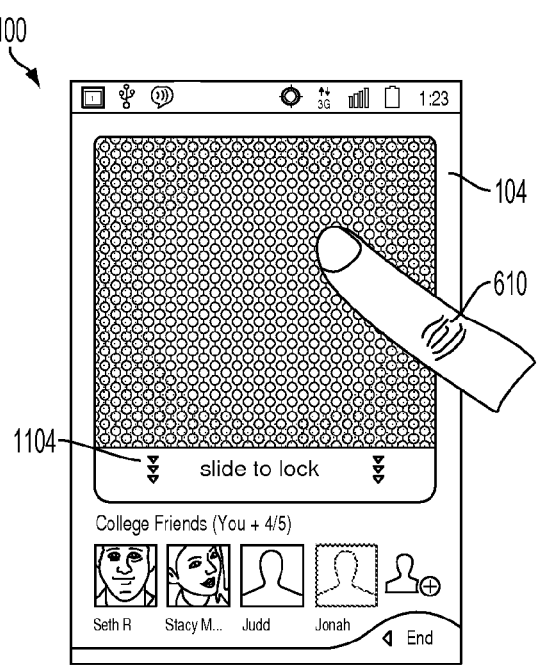

FIGS. 11A-D are screenshots of a touchscreen display 104 illustrating a user-actuated locking mechanism which may be used to lock control of the floor in a group communication (e.g., PTT) enabled device 100 device for "hands-free" operation. In FIG. 11A, the display 104 includes a virtual PTT button 1102. In various embodiments, the virtual PTT button 1102 may function much like a conventional hardware PTT button. When the device 100 detects a touch event on the virtual button 1102, the device 100 may transmit a request to the communication server 310 to open a communication channel from the wireless device 100 to the other device(s) in the PTT group. FIG. 11B illustrates the display screen 104 showing that the user's finger 610 is touching the display screen 104 and the floor has been granted to the user's device 100. As described above, the display screen 104 can use visual feedback, such as graphical elements or color coding, to indicate to the user that the floor has been granted.

In some embodiments, in a conventional mode of operation the device 100 may maintain floor control while the device detects a touch event on the screen 104 or on a portion thereof. Thus, the device may operate like a conventional PTT-enabled device having a dedicated PTT button in which the user must keep the PTT button pressed while communicating with the group. Thus, in order to communicate with the at least one other member of the communication group, the user must maintain continuous touch contact with the screen 104. It will be understood that even where the user maintains touch contact with the screen, the user's device may still lose control of the floor, where, for example, another device in the group, having a higher priority than the original user's device as determined by server 310, simultaneously requests control of the floor.

Figure 11C:
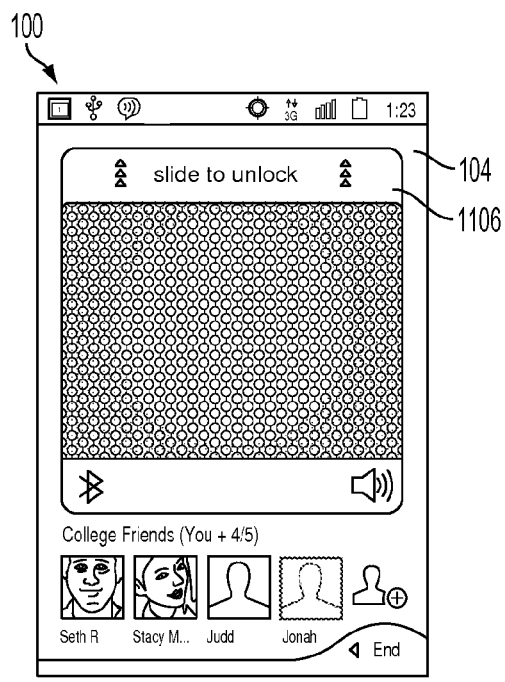
Figure 11D:
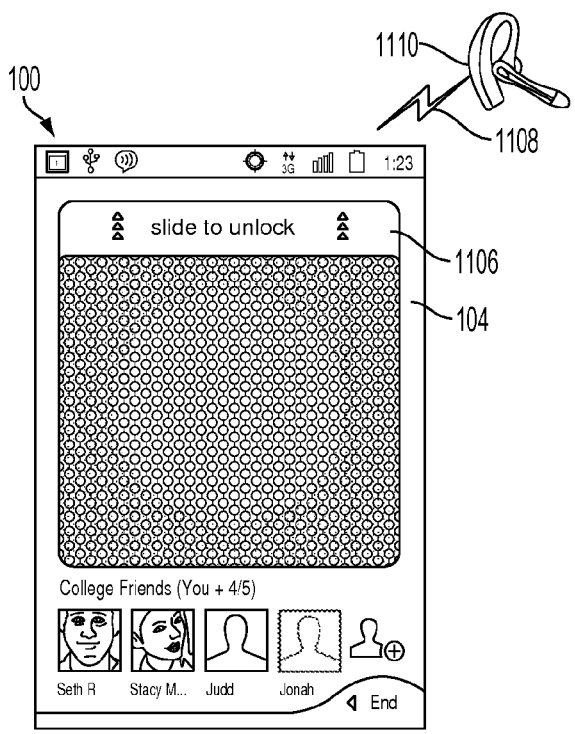

In various embodiments, in addition to the conventional mode described above, the device 100 may additionally include a "hands-free" mode in which the user may actuate a locking mechanism to maintain control of the floor (i.e., "lock" the floor) without requiring the user to continuously maintain contact with the screen. The user actuated locking mechanism may take a variety of forms, such as a virtual button on a touchscreen interface/display, or a key entry on a conventional keypad interface. As shown in FIG. 11B, the locking mechanism 1104 may be a sliding lock on a touchscreen display 104. The sliding lock may be a "target-based" lock, meaning that the user may actuate the lock by touching the screen at a first location and then sliding his or her finger 610 towards a second "target" location on the screen. The device 100 may detect a touch event on the first location and the sliding movement of the finger 610 towards the second "target" location. When the device 100 detects the finger 610 within a pre-determined proximity to the target location, the device 100 may enter a "hands-free" mode, in which the device 100 maintains an open communication channel without requiring continuous user contact with the user interface. In the example shown in FIGS. 11A-B, the first location may be the virtual PTT button 1102 in FIG. 11A and the second, or "target" location may be the "slide to lock" bar 1104 in FIG. 11B. The user may actuate the "hands-free" mode by sliding his or her finger 610 from the virtual PTT button 1102 to the "slide to lock" bar 1104. This actuates the sliding lock mechanism. The device 100 may provide visual and/or audio feedback of entry into the "hands-free" mode. For example, as shown in FIG. 11C, upon entry into the "hands-free" mode, the "slide to lock" bar 1104 may disappear and a "slide to unlock" bar 1106 may be displayed in a different location. In various embodiments, the "hands-free" mode may enable a user to maintain an open PTT communication channel without physically contacting the user interface or even without holding the device. As shown in 11C, in the "hands free" mode, the device may maintain control of the "floor" for group communication when the user's finger 610 is removed from the screen 104. The device 100 may utilize a speakerphone option. In certain embodiments, as shown in FIG. 11D, the hands-free mode may be used in conjunction with an earpiece device 1110, such as a headset, which may be connected to the device 100 via a suitable link, which may be a wireless link 1108, such as a BLUETOOTH® wireless link.

The device 100 may remain in hands-free mode until either the device 100 loses floor control (e.g., the server 301 grants control of the floor to another device based on server floor arbitration priority rules), or the user actuates an unlocking mechanism. In various embodiments, the unlocking mechanism may be the same mechanism as the locking mechanism, and the user may toggle between a locked and an unlocked state. Thus, to de-activate the locking mechanism the user may slide the locking mechanism (e.g., a virtual display on a touchscreen interface) in the opposite direction as the locking movement in order to de-activate the locking mechanism. The unlocking mechanism may be a virtual button on a touchscreen interface/display, or a key entry on a conventional keypad interface. As shown in FIG. 11C, the unlocking mechanism 1106 may be a sliding lock on a touchscreen display 104. The sliding lock may be a "target-based" lock, as described above. In the example shown in FIG. 11C, the user may touch a first location, which may be in the central region of the display 104 and slide his or her finger to a "target" location, which may be the "slide to unlock" bar 1106. When the device 100 detects the user's finger within a pre-determined proximity of the "slide to unlock" bar 1106, the device may exit the "hands-free" mode, de-activate the lock mechanism and return to a conventional mode of operation.

Figure 12:
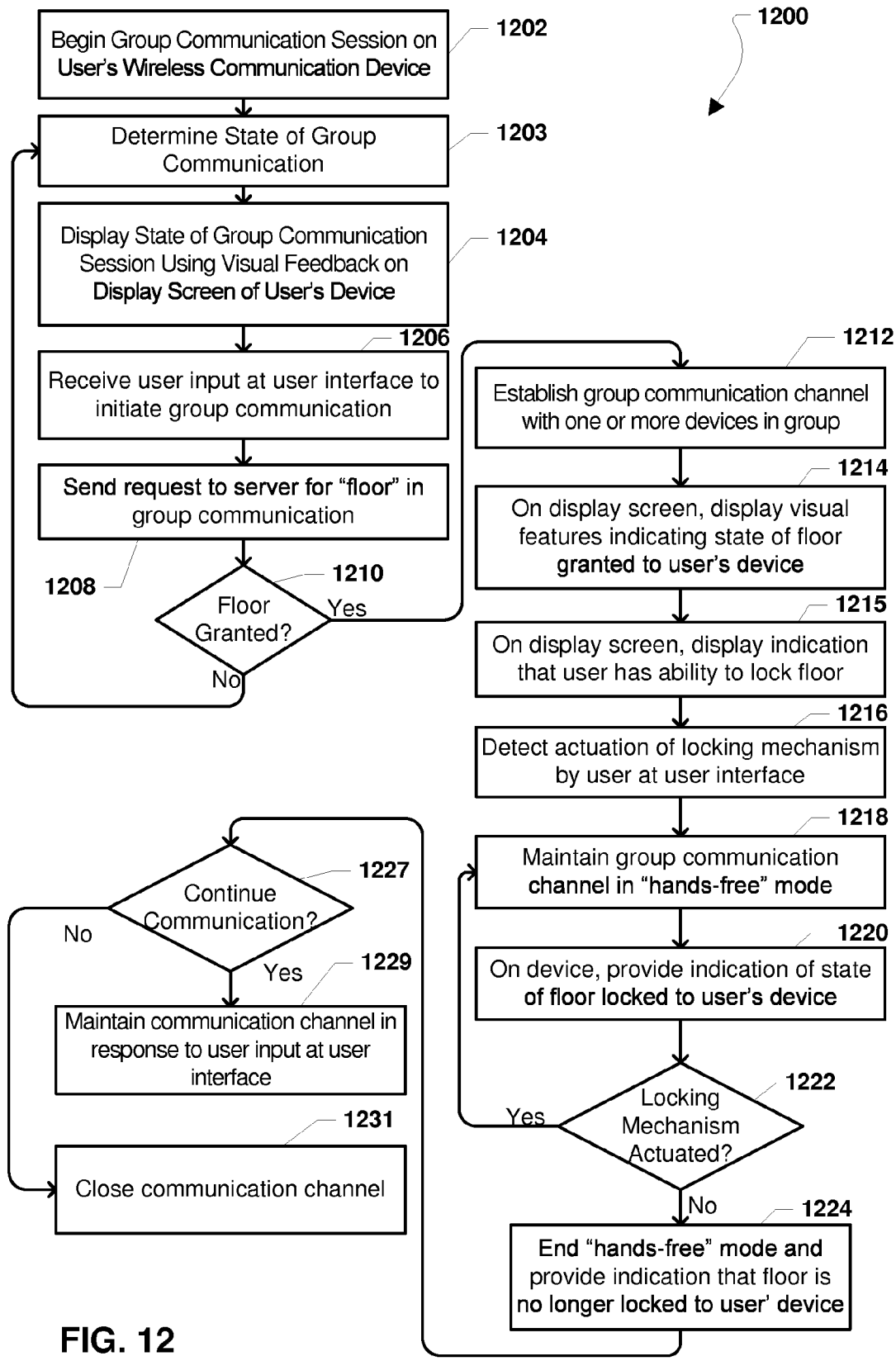
FIG. 12 is a process flow diagram of an embodiment method of group communication using a "hands-free" mode.

FIG. 12A is a process flow diagram illustrating an embodiment method 1200 of group communication, such as PTT communication, with a wireless communication device 100 using a "hands-free" mode. The device 100 may begin a group communication session in block 1202 and determine a state of the group communication in block 1203. The device 100 may display, on a display screen 104, the state of the group communication session using visual feedback in block 1204. The device 100 may receive user input on a user interface to initiate a group communication in block 1206. The user input may be a touch event on a touchscreen, such as a touch event on a virtual PTT button, as described above in connection with FIGS. 11A-D. In other embodiments, the user input may be a key entry on a keypad interface. The device 100 may send a request to a server, such as communication server 310, for control of the "floor" in a group communication session in block 1208. If control of the floor is not granted (i.e., determination block 1210=No), then the device may proceed to block 1203 to determine the state of the group communication. When control of the floor is granted (i.e., determination block 1210=Yes), then the device 100 may establish an open group communication channel with one or more devices in a communication group in block 1212. The device 100 may display visual feedback on the display screen 104 indicating a group communication state of floor granted to the user's device in block 1214.

The device may display an indication that the user has the ability to lock the floor in block 1215. This may include displaying a locking mechanism on the screen, such as the "slide-to-lock" indication in FIG. 11B. The device 100 may detect the actuation of a locking mechanism by the user on the user interface in block 1216. In various embodiments, the user-actuated locking mechanism may be, for example, a virtual button on a touchscreen interface/display, or a key entry on a conventional keypad interface. In some embodiments, such as shown in FIGS. 11A-D, the locking mechanism 1104 may be a sliding lock on a touchscreen display 104. The sliding lock may be a "target-based" lock, meaning that the user may actuate the lock by touching the screen at a first location and then sliding his or her finger towards a second "target" location on the screen.

While the locking mechanism is actuated, the device 100 may maintain the open group communication channel in a "hands-free" mode in block 1218. As described above, the "hands-free" mode of the device 100 may enable the device to maintain control of the floor (i.e., "lock" the floor) without requiring the user to continuously maintain contact with the user interface, as is the case in conventional PTT-enabled devices. The device 100 may provide an indication of a group communication state of floor locked to the user's device in block 1220. For example, the device 100 may provide audio feedback and/or display visual feedback on display screen 104 to indicate that the floor is locked to the user's device in "hands-free" mode. The device 100 may remain in "hands-free" mode while the locking mechanism remains actuated (i.e., determination block 1222=Yes). The user may unlock the device 100 by actuating an unlocking mechanism, which in various embodiments may be the same as the locking mechanism, may involve de-activating the locking mechanism by moving the indication in the opposite direction to locking, and may be a virtual button on a touchscreen interface or a key entry on a keypad interface. As shown in FIGS. 11A-D, the unlocking mechanism 1106 may be a sliding lock on a touchscreen display 104. The sliding lock may be a "target-based" lock, meaning that the user may unlock the device by touching the screen at a first location and then sliding his or her finger towards a second "target" location on the screen.

When the locking mechanism is de-activated or no longer actuated (i.e., determination block 1222=No), the device 100 may end the "hands-free" mode and provide an indication that the floor is no longer locked to the user's device in block 1224. The device 100 may continue the group communication (i.e., determination block 1227=Yes), and maintain the communication channel in response to user input (such as the user continuing to contact the touchscreen) in block 1229, or the device may not continue the communication (i.e., determination block 1227=No) and close the communication channel in block 1231. In various embodiments, a locking mechanism such as described above in connection with FIGS. 11A-D and 12 may be used to initiate other PTT modes, in alternative to or in addition to the "hands-free" mode described above. In some embodiments, the device 100 may include a plurality of user-actuated locking mechanisms, which may be, for example, virtual buttons on a touchscreen interface/display, and/or key entries on a conventional keypad interface. In some embodiments, the device 100 may include a sliding lock on a touchscreen display 104, such as shown in FIGS. 11A-D. The sliding lock may be a "target-based" lock having a plurality of different "target" locations on the screen. The user may actuate and de-actuate different locks by touching the screen at a first location and then sliding his or her finger towards the different "target" locations on the screen. The different target locations may correspond with different PTT modes, according to various embodiments.

Figure 13A:
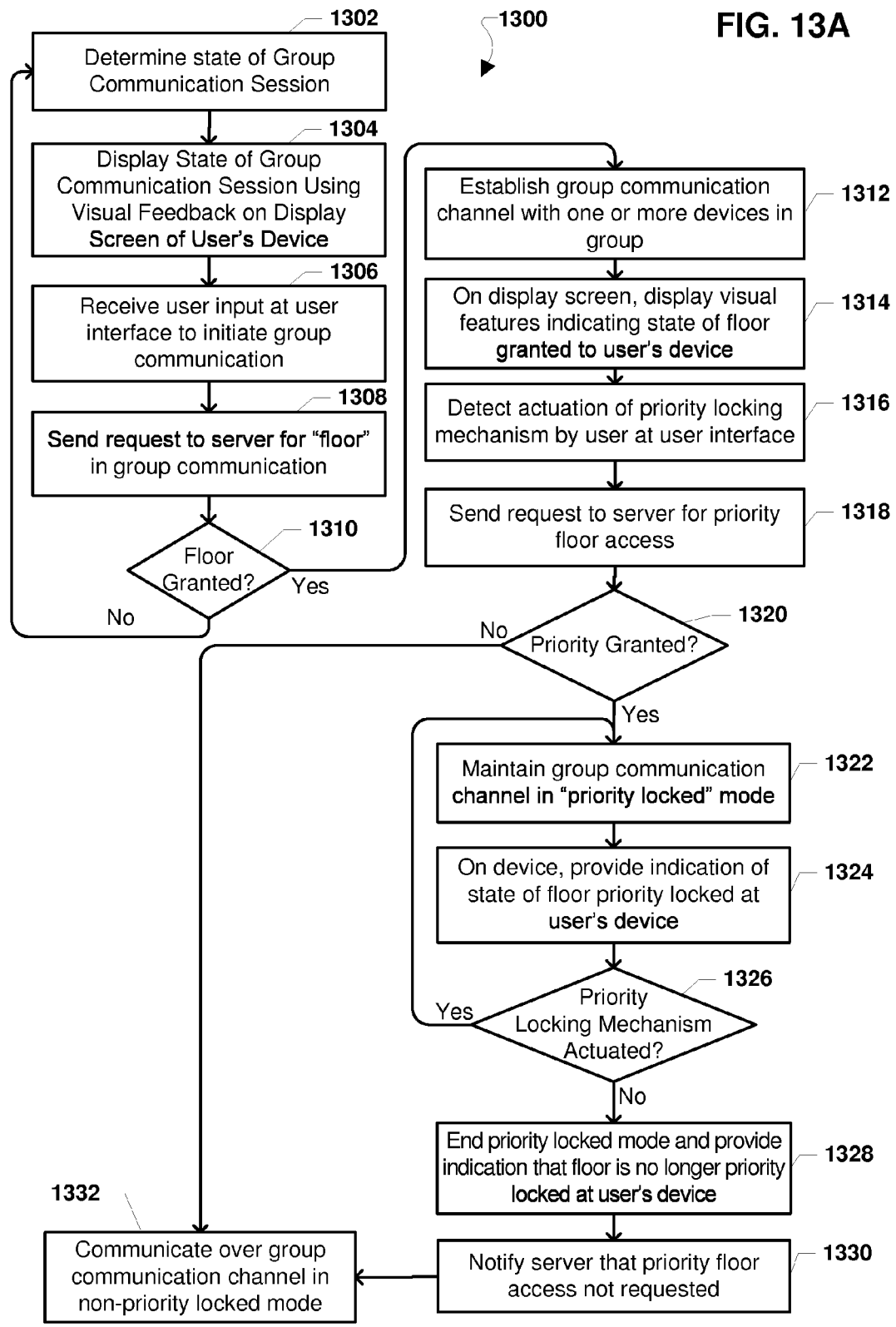
FIG. 13A is a process flow diagram of an embodiment method of group communication using a "priority lock" mode.

FIG. 13A is a process flow diagram illustrating an embodiment method 1300 of group communication, such as PTT communication, with a wireless communication device 100 using a "priority lock" mode. The priority lock mode may be utilized when the user desires priority access to the "floor" in a group communication. In various embodiments, the initiation of the "priority lock" mode may provide the device with uninterrupted control of the floor in a group communication while the priority lock is actuated. In various embodiments, the initiation of the priority lock by the user's device may temporarily alter the priority rules used by a server 310 in arbitrating between different devices in a group for control of the floor. In various embodiments, the priority lock mode may be used to provide a device 100 with a higher priority status at the server 310 when arbitrating between competing requests for the floor than the priority status of the device 100 when the device not in priority lock mode.

In the embodiment method 1300 shown in FIG. 13A, the device 100 may determine the state of a group communication session in block 1302. The device 100 may display, on a display screen 104, a state of the group session using visual feedback in block 1304. The device 100 may receive user input on a user interface to initiate a group communication in block 1306. The user input may be a touch event on a touchscreen, such as a touch event on a virtual PTT button, as described above in connection with FIGS. 11A-D. In other embodiments, the user input may be a key entry on a keypad interface. The device 100 may send a request to a server, such as communication server 310, for control of the "floor" in a group communication session in block 1308. If control of the floor is not granted (i.e., determination block 1310=No), then the device may determine the updated state of the group communication in block 1302 and display the updated state in block 1304. When control of the floor is granted (i.e., determination block 1310=Yes), then the device 100 may establish an open group communication channel with one or more devices in a group in block 1312. The device 100 may display visual feedback on the display screen 104 indicating a group communication state of floor granted to the user's device in block 1314. The device 100 may further provide an indication to the user that a priority locked mode is available.

The device 100 may detect the actuation of a priority locking mechanism by the user on the user interface in block 1316. In various embodiments, the user-actuated locking mechanism may be, for example, a virtual button on a touchscreen interface/display, or a key entry on a conventional keypad interface. In some embodiments, the locking mechanism may be a sliding lock on a touchscreen display 104, such as the sliding locking mechanism shown in FIGS. 11A-D. The sliding lock may be a "target-based" lock, meaning that the user may actuate the lock by touching the screen at a first location and then sliding his or her finger towards a second "target" location on the screen. In various embodiments, the sliding lock may include a plurality of target locations on the display screen, where each target location initiates a different group communication mode of the device. For example, a first target location may correspond with a "priority lock" mode, and a second target location may correspond with another mode, such as the "hands-free" mode described above in connection with FIG. 12.

Upon detection of a user actuation of the priority locking mechanism in block 1316, the device 100 may send a request to a server, such as communication server 310, for priority floor access at block 1318. If the request is not granted (i.e., determination block 1320=No), the device 100 may then communicate over the group communication channel in a non-priority locked mode in block 1332. When the request is granted (i.e., determination block 1320=Yes), the device 100 may maintain the group communication channel in "priority locked" mode in block 1322 and display a state of floor priority locked on user's device 100 in block 1324. In various embodiments, the priority lock mode may provide the device 100 with control of the floor which generally may not be interrupted by another device in the group. While the priority locking mechanism is activated (i.e., determination block 1326=Yes), the device may maintain the group communication channel in a "priority lock" mode in block 1322. When the priority locking mechanism is no longer actuated (i.e., determination block 1326=No), then the device 100 may end the priority lock mode and provide an indication that the floor is no longer priority locked in block 1328. The device 100 may notify the server 310 that priority floor access is no longer requested at block 1330. The device 100 may continue to communicate over the group communication channel in a non-priority locked mode in block 1332.

In some embodiments, priority locking mechanism may allow the user to lock the device to one of a plurality of different priority levels. This may be similar to an automotive transmission gearshift, in which the different priority levels are analogous to the different gears (e.g., first gear, second gear, third gear, etc.) of a gearshift. A first priority locking level may provide a first level of priority access for floor control, a second priority level may provide a second, progressively higher level of priority access for floor control, and so forth. The various priority levels may be actuated using a target-based sliding lock mechanism, such as described above, where the user may use the locking mechanism to actuate progressive levels of priority locking.

Figure 13B:
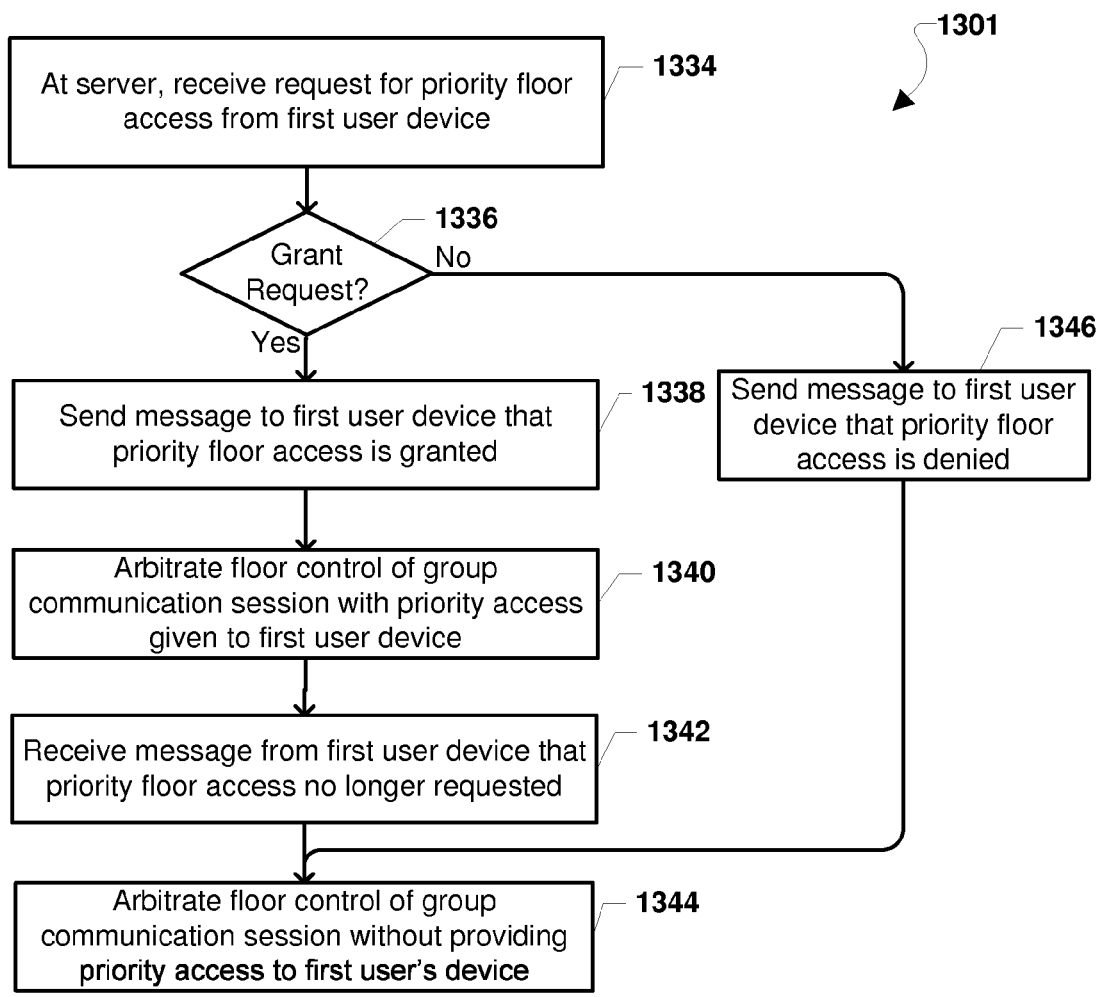
FIG. 13B is a process flow diagram of an embodiment method of operation of a server in a group communication session in which a user device requests priority floor access.

FIG. 13B is a process flow diagram illustrating an embodiment method 1301 of operation of a server 310 in a group communication session, such as a PTT communication session, in which a user device requests priority floor access. In some embodiments, the method 1301 of FIG. 13B may be performed in conjunction with method 1300 of FIG. 13A. The server 310 may receive a request for priority floor access from a first user device 100 in block 1334. The server 310 may determine whether to grant or deny the request at determination block 1336. The server 310 may deny the request (i.e., determination block 1336="No"), for example, if the priority locking feature is not authorized or otherwise not available for the requesting user device 100. The server 310 may then send a message to the first user device 100 that the request for priority floor access is denied in block 1346, and arbitrate floor control of the group communication session in accordance with the normal priority rules (i.e., without providing priority access to the first user device 100) in block 1344. If the server 310 grants the request for priority floor access (i.e., determination block 1336="Yes"), then the server 310 may send a message to the first user device 100 indicating that priority floor access is granted in block 1338. In block 1340, the server 310 may arbitrate floor control of the group communication session with priority floor access being given to the first user device 100. In various embodiments, the server 310 may give priority floor access by immediately granting the floor to the first user device 100, regardless of whether another device currently has the floor, and may grant the first user device 100 uninterrupted control of the floor until the first user device 100 indicates that priority floor access is no longer requested. The server 310 may receive a message from the first user device 100 that priority floor access is no longer requested at block 1342. The server 310 may then arbitrate floor control of the group communication session in accordance with the normal priority rules (i.e., without providing priority access to the first user device 100) in block 1344.

In various embodiments, the server 310 may grant priority floor access to a user device for a pre-determined maximum time period, and if no message is received from the user device 100 within that time period, the server 310 may release the user device 100 from priority floor access. The server 310 may also implement priority rule(s) for handling floor control in cases where more than one user device requests priority floor access at the same time.

Figure 14A:
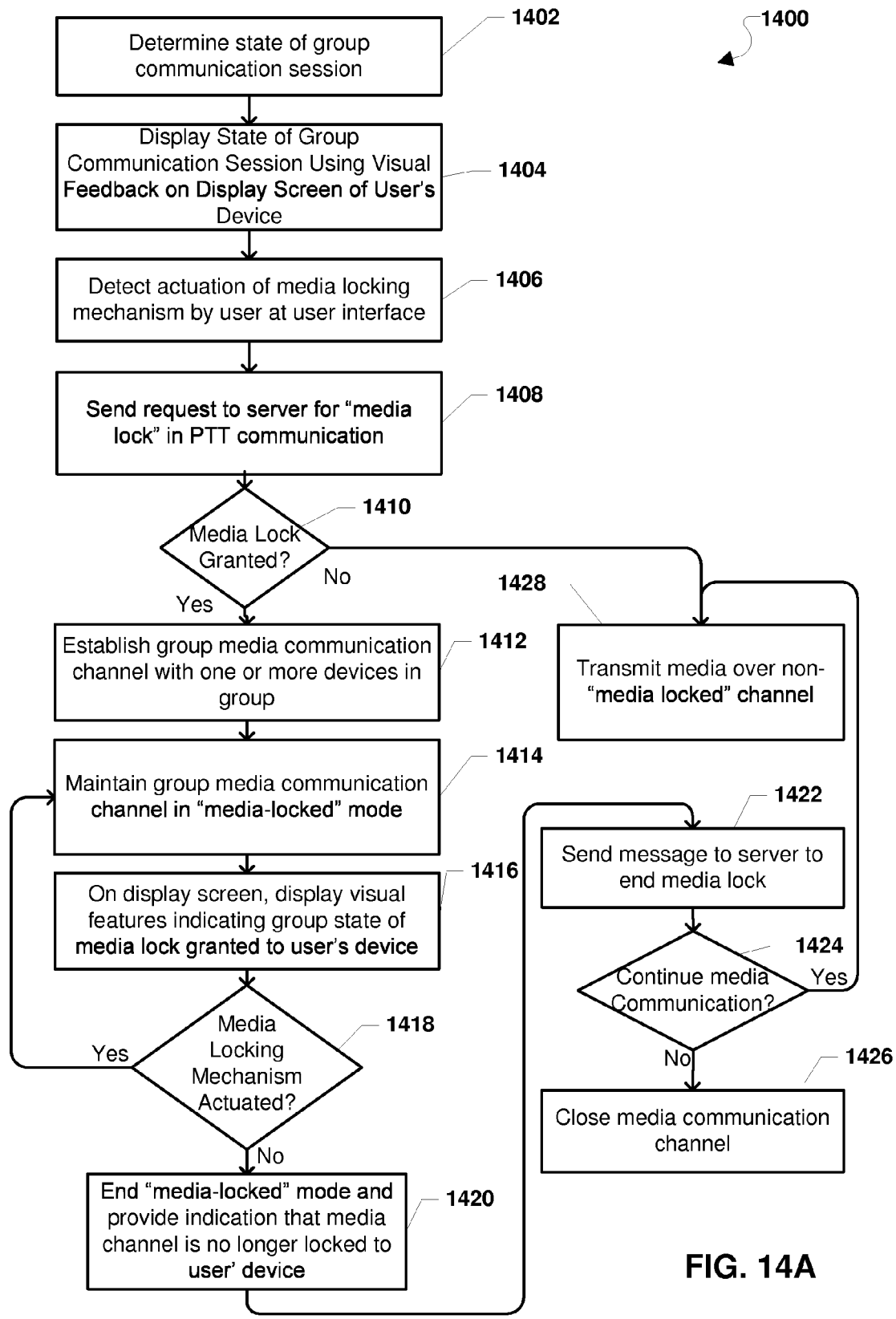
FIG. 14A is a process flow diagram of an embodiment method of group communication using a "media lock" mode.

FIG. 14A is a process flow diagram illustrating an embodiment method 1400 of group communication, such as PTT communication, with a wireless communication device 100 using a "media lock" mode. The media lock mode may be utilized when the user desires priority access to the "floor" for transmitting media file(s) to one or more members of a group in a group communication, while still enabling other devices to transmit voice data to the group. The media files may include, for example, image files, video files, audio files, documents and presentations, and the like. In certain embodiments, the initiation of the "media lock" mode may provide the device with uninterrupted control of the floor for transmitting a media file in a group communication while the media lock is actuated. In various embodiments, the initiation of the media lock by the user's device may temporarily alter the priority rules used by a server 310 in arbitrating floor control for transmitting media files between different devices in a communication group.

In the embodiment method 1400 shown in FIG. 14A, the device 100 may determine a state of a group communication session in block 1402, and display, on a display screen 104, the determined state of the group communication session using visual feedback in block 1404. The device 100 may detect the actuation of a media locking mechanism by the user on the user interface in block 1406. In various embodiments, the user-actuated media locking mechanism may be, for example, a virtual button on a touchscreen interface/display, or a key entry on a conventional keypad interface. In some embodiments, the media locking mechanism may be a sliding lock on a touchscreen display 104, such as the sliding locking mechanism shown in FIGS. 11A-D. The sliding lock may be a "target-based" lock, meaning that the user may actuate the lock by touching the screen at a first location and then sliding his or her finger towards a second "target" location on the screen. In various embodiments, the sliding lock may include a plurality of target locations on the display screen, where each target location initiates a different group communication mode of the device. For example, a first target location may correspond with a "media lock" mode, and one or more additional target location(s) may correspond with another mode, such as the "hands-free" mode described above in connection with FIG. 12 and/or the "priority lock" mode described above in connection with FIG. 13A.

Upon detection of a user actuation of the media locking mechanism in block 1406, the device 100 may send a request to a server, such as communication server 310, for a media lock at block 1408. If the request is not granted (i.e., determination block 1410=No), the device 100 may transmit media in the normal manner over a non-"media-locked" channel in block 1428. When the request is granted (i.e., determination block 1410=Yes), the device 100 may establish a group media communication channel in block 1412, and maintain the group media communication channel in "media locked" mode in block 1414. The device 100 may display on the display screen 104 visual features indicating a group communication state of media lock granted in block 1416. While the media locking mechanism is actuated (i.e., determination block 1418=Yes), the device 100 may maintain the group media communication channel in a media locked mode in block 1414. When the media locking mechanism is no longer actuated (i.e., determination block 1418=No), then the device 100 may send a message to the server 310 to end the media lock at block 1422. The device 100 may discontinue the media communication (i.e., determination block 1424=No), and close the group media communication channel in block 1426. The device may alternatively continue the media communication (i.e., determination block 1424=Yes) and transmit the media over a non-"media locked" channel in block 1428.

Figure 14B:
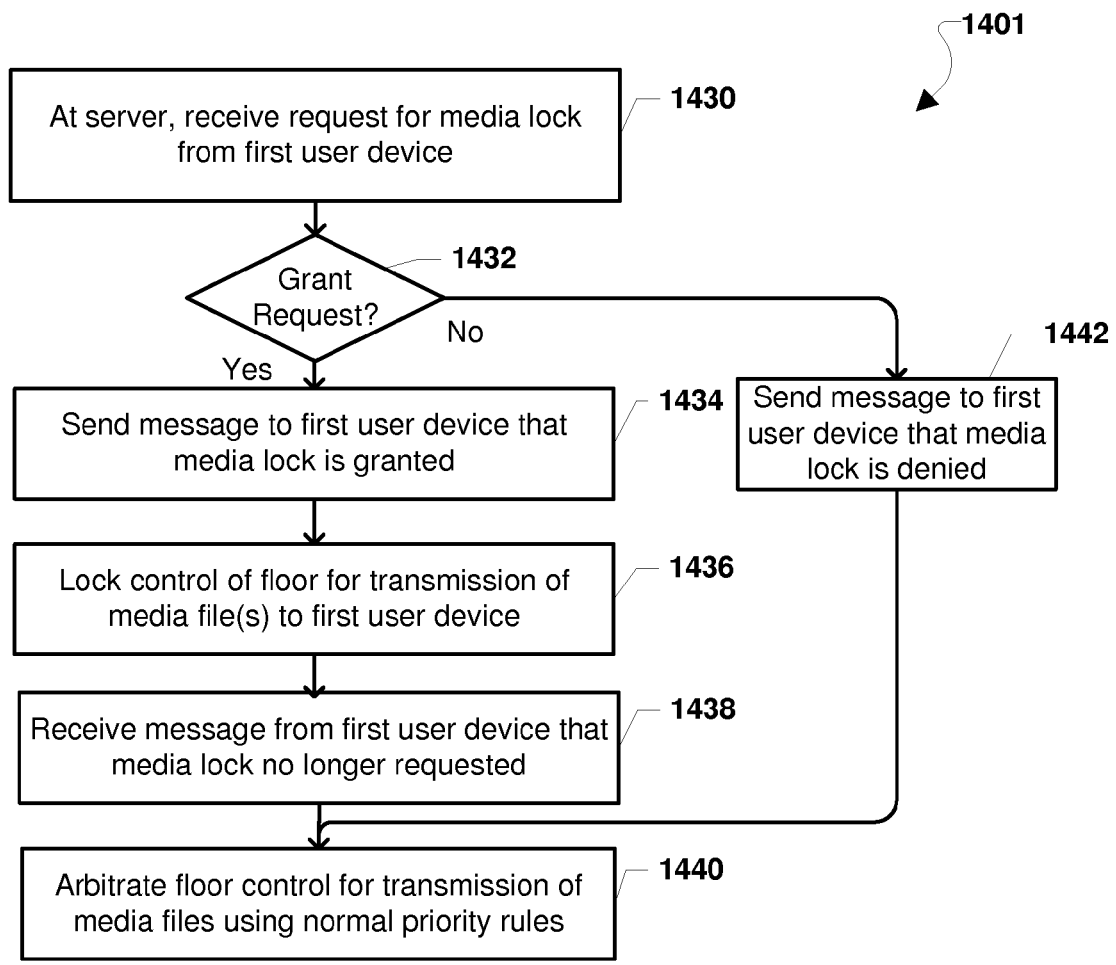
FIG. 14B is a process flow diagram of an embodiment method of operation of a server in a group communication session in which a user device requests a media lock.

FIG. 14B is a process flow diagram illustrating an embodiment method 1401 of operation of a server 310 in a group communication session, such as a PTT communication session, in which a user device requests a "media lock" for transmission of media file(s). In some embodiments, the method 1401 of FIG. 14B may be performed in conjunction with method 1400 of FIG. 14A. The server 310 may receive a request for a media lock from a first user device 100 in block 1430. The server 310 may determine whether to grant or deny the request at determination block 1432. The server 310 may deny the request (i.e., determination block 1432=No), for example, if the media lock feature is not authorized or is otherwise not available for the requesting user device 100. The server 310 may then send a message to the first user device 100 that the request for a media lock is denied in block 1442, and arbitrate floor control of the group communication session for transmission of media files using the normal priority rules (i.e., without providing a media lock to the first user device 100) in block 1440. If the server 310 grants the request for priority floor access (i.e., determination block 1432=Yes), then the server 310 may send a message to the first user device 100 indicating that priority floor access is granted in block 1434. In block 1336, the server 310 may lock control of the floor for transmission of media file(s) to the first user's device 100. In various embodiments, while the floor is "locked" to the first user's device 100 for transmission of media files, the server 310 may still arbitrate control of the floor for voice communication between the various user devices in the communication group. The server 310 may receive a message from the first user device 100 that the media lock is no longer requested at block 1438. The server 310 may then arbitrate floor control for transmission of media files in accordance with the normal priority rules (i.e., without providing a media lock to the first user device 100) in block 1440.

In various embodiments, the server 310 may grant a media lock to a user device 100 for a pre-determined maximum time period, and if no message is received from the user device 100 within that time period, the server 310 may release the media lock. The server 310 may also implement priority rule(s) for handling floor control in cases where more than one user device requests a media lock at the same time.

Figure 15A:
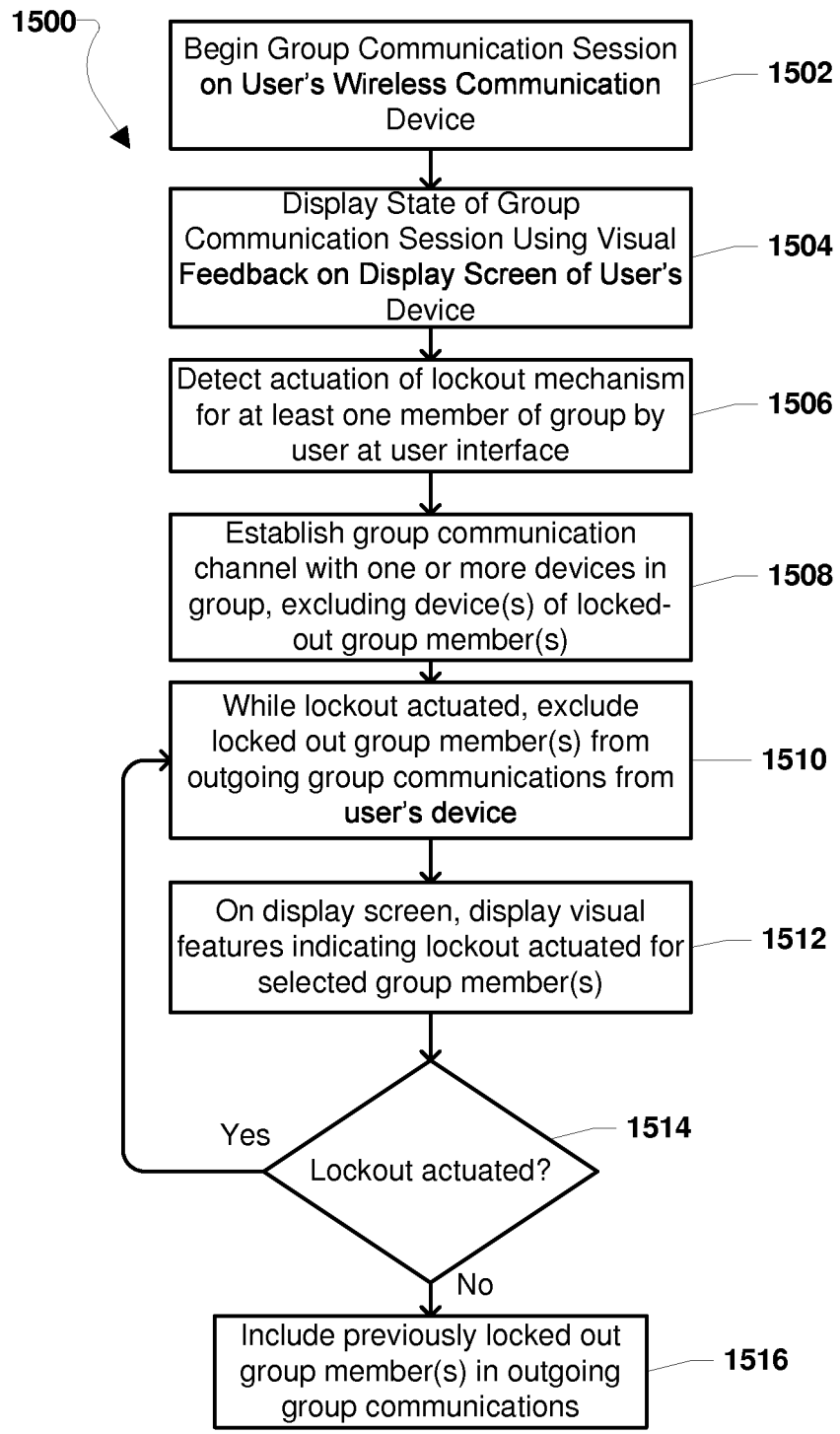
FIG. 15A is a process flow diagram of an embodiment method of group communication using a "lockout" mode.

FIG. 15A is a process flow diagram illustrating an embodiment method 1205 of PTT communication with a wireless communication device 100 using a "lockout" mode. The lockout mode may be utilized to enable the user to temporarily exclude one or more members of the group communication group from receiving communications from the user's device 100 during a group communication session.

In the embodiment method 1500 shown in FIG. 15A, the device 100 may begin a group communication session, such as a PTT communication, in block 1502. The device 100 may display, on a display screen 104, a state of the group communication session using visual feedback in block 1504. The device 100 may detect the actuation of a lockout mechanism by the user on the user interface in block 1506. In various embodiments, the user-actuated lockout mechanism may be, for example, a virtual button on a touchscreen interface/display, or a key entry on a conventional keypad interface. In some embodiments, the media locking mechanism may be a sliding lock on a touchscreen display 104, such as the sliding locking mechanism shown in FIGS. 11A-D. The sliding lock may be a "target-based" lock, meaning that the user may actuate the lock by touching the screen at a first location and then sliding his or her finger towards a second "target" location on the screen. In various embodiments, the sliding lock may include a plurality of target locations on the display screen, where each target location initiates a different group communication mode of the device. For example, a first target location may correspond with a "lockout" mode, and one or more additional target location(s) may correspond with another group communication mode, such as the "hands-free" mode described above in connection with FIG. 12, the "priority lock" mode described above in connection with FIG. 13A and/or the "media lock" mode described above in connection with FIG. 14A.

In various embodiments, the user may select one or more members of the group with which to "lock out" from group communications. The user may, for example, select a contact icon representing a particular group member and actuate the lockout mechanism to lock out the group member from group communications. In some embodiments, the contact icon of the group member to be locked out may be the "target" in a target-based sliding lock mechanism. The user may slide his or her finger to particular contact icon(s) to lock out the respective user(s) from group communication. In some embodiments, the user may drag the contact icons to an additional target location, such as a "lockout" icon, to effectuate the lockout mode with respect to that group member. In other embodiments, the device 100 may display a locking mechanism (e.g., a slide-to-lock bar, a "virtual" switch, toggle, button, etc.) in association with each contact icon. The locking mechanism may be displayed, for example, after the user first touches the contact icon. Actuating the locking mechanism may effectuate the lockout mode with respect to the selected group member.

Upon detection of the user actuation of the lockout mechanism in block 1506, the device 100 may establish a group communication channel with one or more devices in the group, excluding device(s) of locked-out group member(s) in block 1508. This may involve a temporary reconfiguring of the group communication session, which may be performed by, or in conjunction with, a group communication server 310, as discussed below. The user device 100 may exclude the device(s) of locked-out group member(s) from outgoing group communications in block 1510. The device 100 may display on the display screen 104 visual features indicating that a lockout is actuated with respect to selected group member(s) in block 1512. While the lockout is actuated (i.e., determination block 1514=Yes), the device 100 may continue to exclude the device(s) of locked out group member(s) from outgoing group communications from the user's device 100 in block 1510. When the lockout mechanism is no longer actuated (i.e., determination block 1514=No), then the device 100 may include the device(s) of previously locked out group member(s) in outgoing group communications in block 1516. In other words, the group communication session may be returned to its original configuration.

Figure 15B:
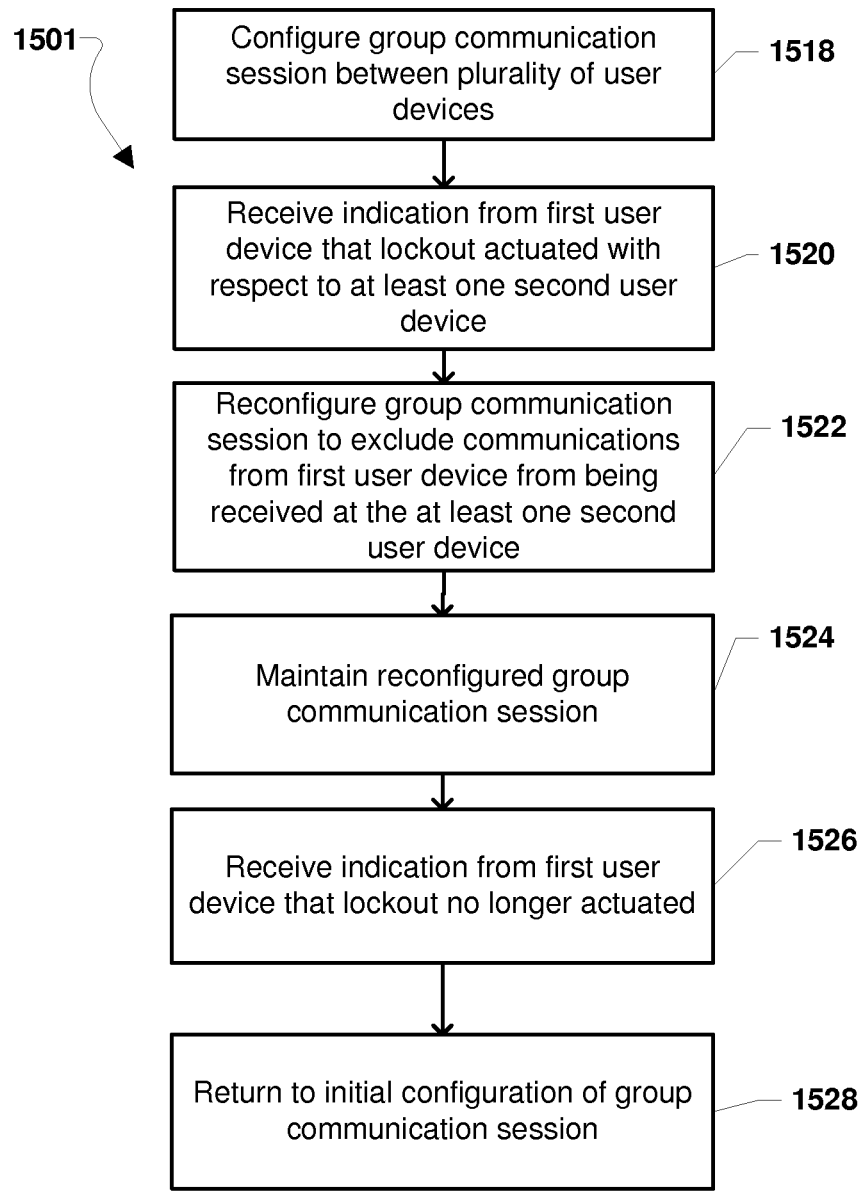
FIG. 15B is a process flow diagram of an embodiment method of operation of a server in a group communication session in which a user device actuates a lockout mechanism.

FIG. 15B is a process flow diagram illustrating an embodiment method 1501 of operation of a server 310 in a group communication session, such as a PTT communication session, in which a lockout mechanism is activated on a user device with respect to at least one other user device in the communication group. In some embodiments, the method 1501 of FIG. 15B may be performed in conjunction with method 1500 of FIG. 15A. In block 1518, the server 310 may configure a group communication session between a plurality of user devices in a normal manner. The server 310 may receive an indication from a first user device 100 that a lockout mechanism has been actuated with respect to at least one second user device in the communication group in block 1520. The server 310 may (temporarily) reconfigure the group communication session to exclude communications from the first user device 100 from being received by the "locked out" devices at block 1522. The server 310 may maintain this reconfigured group communication session (block 1526) until the server 310 receives an indication from the first user device 100 that the lockout is no longer actuated with respect to the at least one second user device in block 1526. The server 310 may return to the initial configuration of the group communication session in block 1528.

Figure 16A:
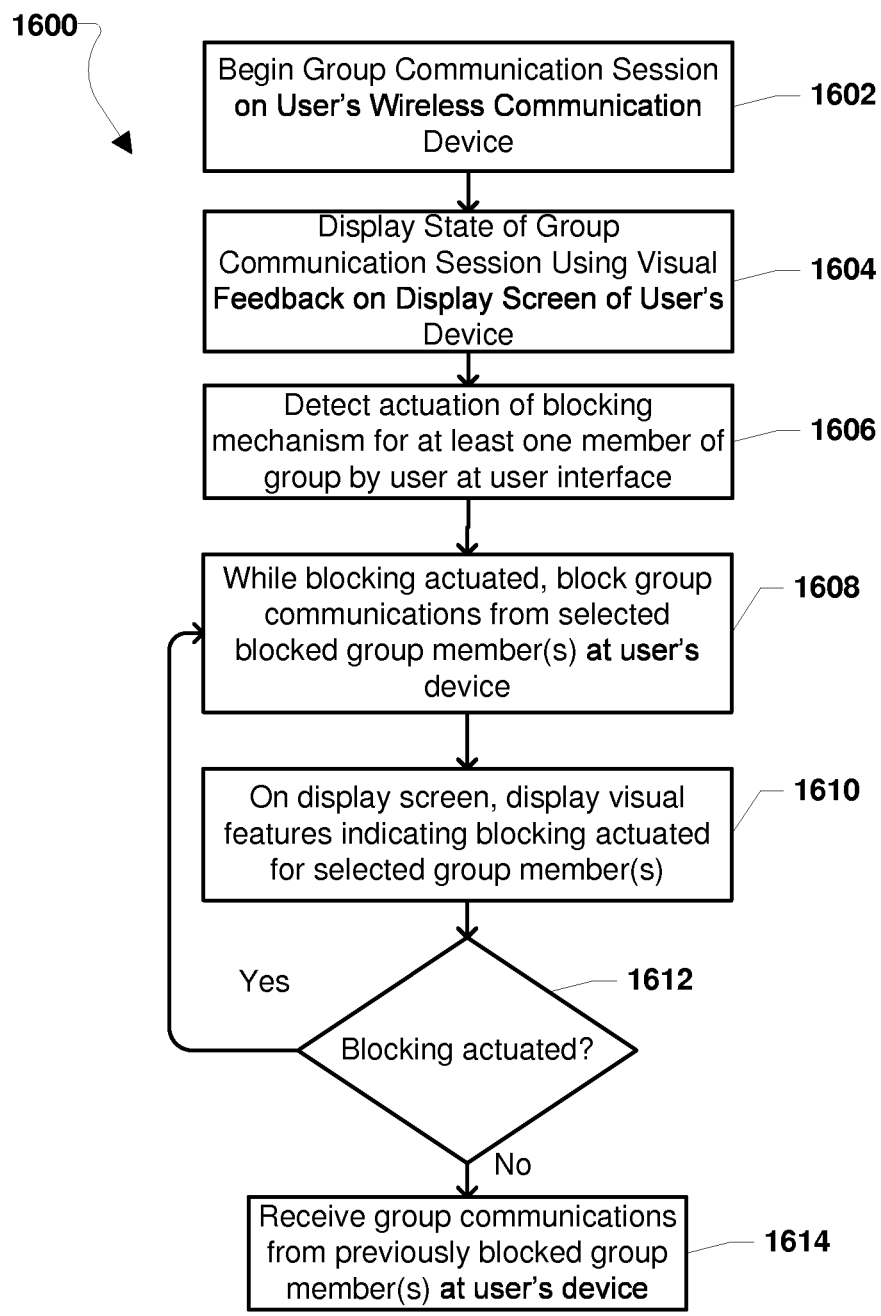
FIG. 16A is a process flow diagram of an embodiment method of group communication using a "blocking" mode.

FIG. 16A is a process flow diagram illustrating an embodiment method 1600 of group communication, such as PTT communication, with a wireless communication device 100 using a "blocking" mode. The blocking mode may be utilized to enable the user to temporarily block the user's device 100 from receiving communications from the device(s) of one or more selected members of the group communication group during a group communication session.

In the embodiment method 1600 shown in FIG. 16A, the device 100 may begin a group communication session in block 1602. The device 100 may display, on a display screen 104, a state of the group session using visual feedback in block 1604. The device 100 may detect the actuation of a blocking mechanism by the user on the user interface in block 1606. In various embodiments, the user-actuated blocking mechanism may be, for example, a virtual button on a touch-screen interface/display, or a key entry on a conventional keypad interface. In some embodiments, the media locking mechanism may be a sliding lock on a touchscreen display 104, such as the sliding locking mechanism shown in FIGS. 11A-C. The sliding lock may be a "target-based" lock, meaning that the user may actuate the lock by touching the screen at a first location and then sliding his or her finger towards a second "target" location on the screen. In various embodiments, the sliding lock may include a plurality of target locations on the display screen, where each target location initiates a different group communication mode of the device. For example, a first target location may correspond with a "blocking" mode, and one or more additional target location(s) may correspond with another mode, such as the "hands-free" mode described above in connection with FIG. 12, the "priority lock" mode described above in connection with FIG. 13A, the "media lock" mode described above in connection with FIG. 14A, and/or the "lockout" mode described above in connection with FIG. 15A.

In various embodiments, the user may select one or more members of the group to "block" from receiving group communications by the user's device 100. The user may, for example, select a contact icon representing a particular group member and actuate the blocking mechanism to block communications from the selected group member. In some embodiments, the contact icon of the group member to be blocked may be the "target" in a target-based sliding lock mechanism. The user may slide his or her finger to particular contact icon(s) to block the respective user(s). In some embodiments, the user may drag the contact icon of a particular group member to a target area, such as a "block" icon, to effectuate the block. In other embodiments, the device 100 may display a locking mechanism (e.g., a slide-to-lock bar, a "virtual" switch, toggle or button, etc.) in association with each contact icon. The blocking mechanism may be displayed, for example, after the user first touches the contact icon. Actuating the blocking mechanism may effectuate a block of the selected group member.

Upon detecting a user actuation of the blocking mechanism in block 1606, the device 100 may block communications from selected blocked group member(s) from being received by the user's device 100 in block 1608. The device 100 may display on the display screen 104 visual features indicating that blocking is actuated with respect to selected group member(s) in block 1610. While the blocking is actuated (i.e., determination block 1612=Yes), the device 100 may continue to block communications from the blocked member(s) in block 1608. When the blocking mechanism is no longer actuated (i.e., determination block 1612=No), then the device 100 may receive communications from previously blocked group members in block 1614.

In some embodiments, the blocking mode may be analogous to a "mute" button, in that the user does not hear or view communications from the blocked group member(s), but other users in the group may still receive communications from the blocked member(s). In some embodiments, the blocking function may be implemented on the user device 100 without the knowledge or intervention of a server. In other embodiments, the user device 100 may signal a server, such as group communication server 310, when the blocking mechanism is actuated, and the server 310 may reconfigure the communication session so that communications from a blocked device are not transmitted to the blocking device 100. In some embodiments, actuating the blocking mechanism with respect to a group member's device may block the selected device from sending any communications to the group (e.g., it may prevent the blocked device from gaining control of the "floor"). In this embodiment, upon actuation of the blocking mechanism, the device 100 may send a request to a server, such as group communication server 310, to block a specified device from communicating with the group. The server 310 may determine whether to block the device based on pre-determined blocking criteria which may be stored at the server 301, and which may include, for example, the priority status of the user requesting the block, the priority status of the user requested to be blocked, the number of different blocking requests received for a particular user, etc.

Figure 16B:
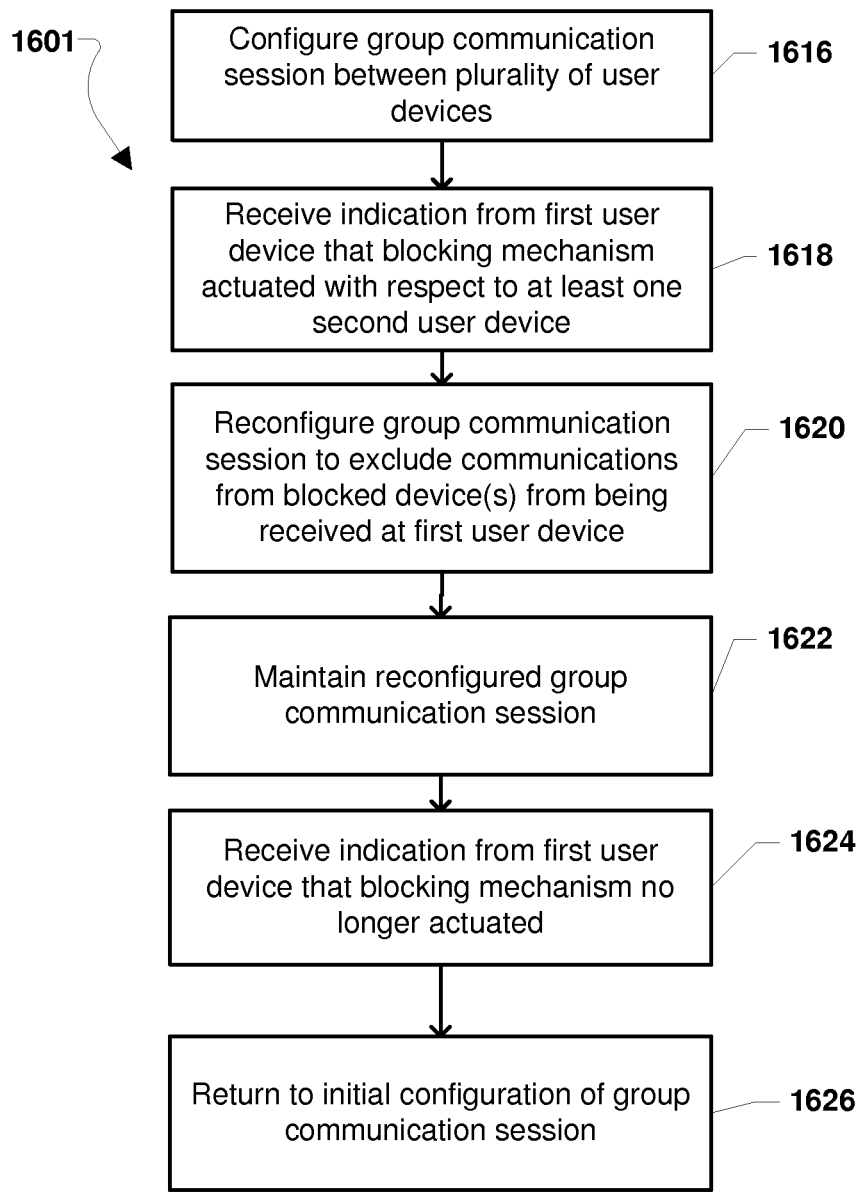
FIG. 16B is a process flow diagram of an embodiment method of operation of a server in a group communication session in which a user device actuates a blocking mechanism.

FIG. 16B is a process flow diagram illustrating an embodiment method 1601 of operation of a server 310 in a group communication session, such as a PTT communication session, in which a blocking mechanism is activated on a user device with respect to at least one other user device in the communication group. In some embodiments, the method 1601 of FIG. 16B may be performed in conjunction with method 1600 of FIG. 16A. In block 1616, the server 310 may configure a group communication session between a plurality of user devices in a normal manner. The server 310 may receive an indication from a first user device 100 that a blocking mechanism has been actuated with respect to at least one second user device (i.e., a "blocked" device) in the communication group in block 1618. The server 310 may (temporarily) reconfigure the group communication session to exclude communications from the "blocked" device(s) from being received at first user device 100 in block 1620. As discussed above, in various embodiments the server 310 may reconfigure the group communication session such that communications from a "blocked" device are not received at any other devices in the communication group. The server 310 may maintain this reconfigured group communication session (block 1622) until the server 310 receives an indication from the first user device 100 that the blocking mechanism is no longer actuated with respect to the at least one second user device in block 1624. The server 310 may return to the initial configuration of the group communication session in block 1626.

Figure 17A:
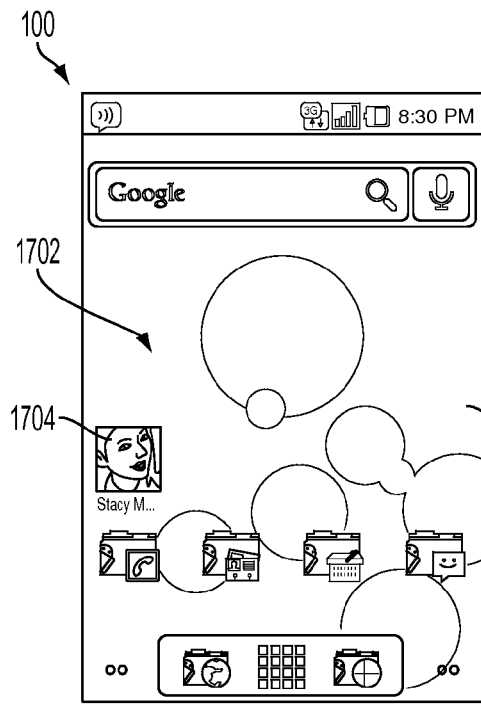
FIGS. 17A-C are screenshots of an embodiment touchscreen display having a "quick contact" group communication shortcut on a home screen.
Figure 17B:
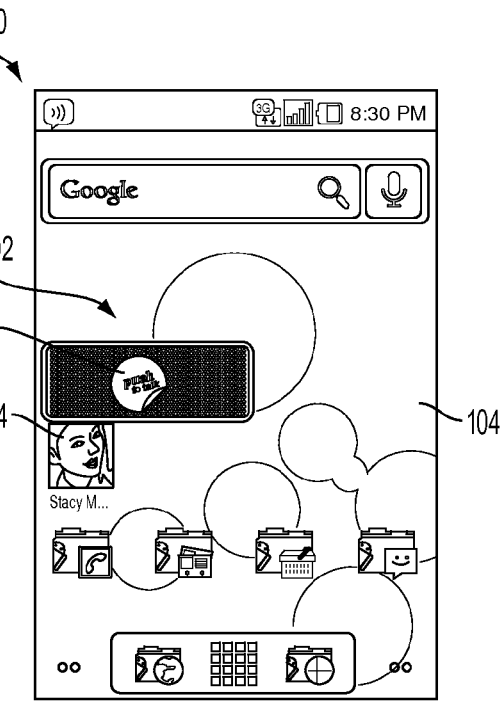
Figure 17C:
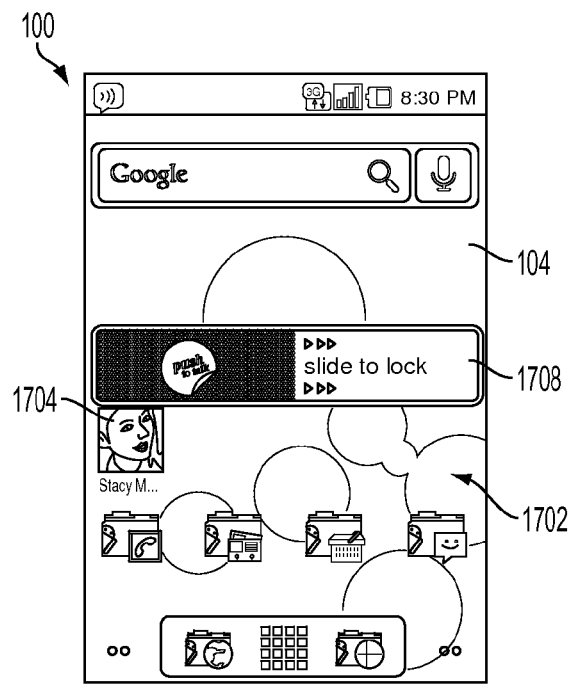

FIGS. 17A-C are screenshots of a touchscreen display 104 of a wireless communication device 100 having a "quick contact" PTT shortcut on a desktop/home screen of the device 100. As shown in FIG. 17A, the device 100 may enable the user to display one or more shortcut icons 1704 to a PTT contact on the home screen 1702. The PTT contact may be an individual PTT user or a group of PTT users. Selection of the shortcut icon 1704 may bring up a modified PTT button 1706, as shown in FIG. 17B. The device 100 may detect a touch event on the PTT button 1706, and in response, establish a PTT communication channel with the device of the contact shown in icon 1704. As shown in FIG. 17C, the modified PTT button may also support the slide to lock feature 1708 in certain embodiments. The slide to lock feature 1708 may initiate a "hands free" mode of operation and/or any of the operating modes described above in connection with FIGS. 12-16B. This is an improvement over existing non-dedicated hardware solutions in that the user does not need to find/launch/navigate the PTT application in order to quickly speak to their contact.

Figure 18A:
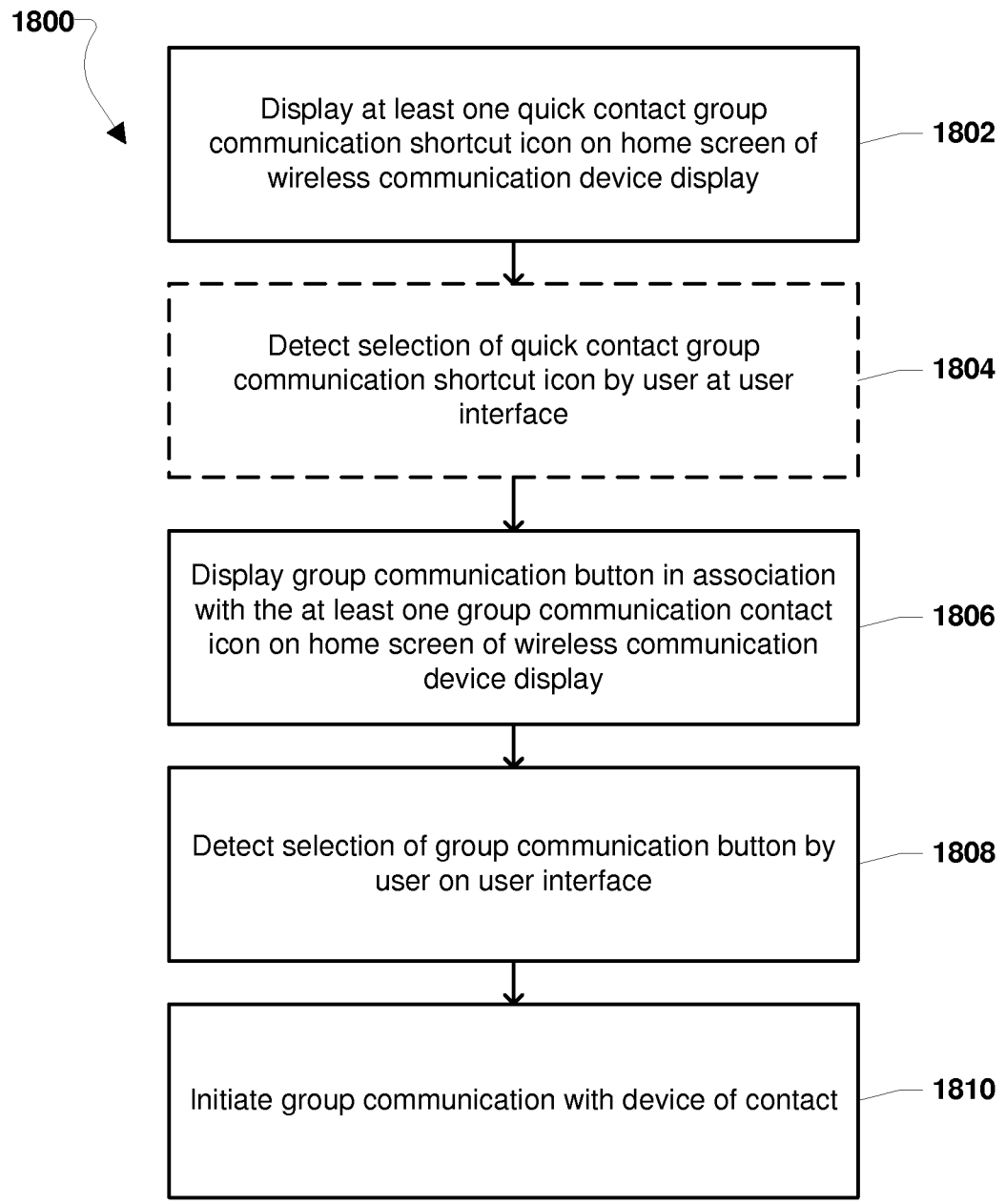
FIG. 18A is a process flow diagram of an embodiment method of group communication using a "quick contact" group communication shortcut.

FIG. 18A is a process flow diagram illustrating an embodiment method 1800 for group communication, such as PTT communication, using a "quick contact" shortcut. A wireless communication device 100 may display at least one quick contact group communication shortcut icon on the home screen of the device display 104 in block 1806. The display 104 may be a touchscreen display. The quick contact shortcut icon(s) may be set up by the user, or can be automatically generated by the device 100 based on, for example, contact information stored on the device.

The device 100 may detect a user selection of a quick contact group communication shortcut icon on a user interface in optional block 1806, and may display a group communication button (e.g., a PTT button) in association with the quick contact shortcut icon in step 1808. In some embodiments, the optional step 1806 may be omitted, and the device 100 may automatically display the group communication button in association with the quick contact shortcut icon in step 1808. In some embodiments, the group communication button may comprise a portion of or the entirety of the quick connect group communication shortcut icon. The device 100 may detect a selection of the group communication button by a user on a user interface in block 1808. In various embodiments using a touchscreen display, the device 100 may detect a touch event on the group communication button. The device 100 may initiate a group communication with the device of the selected contact in block 1810.

Figure 18B:
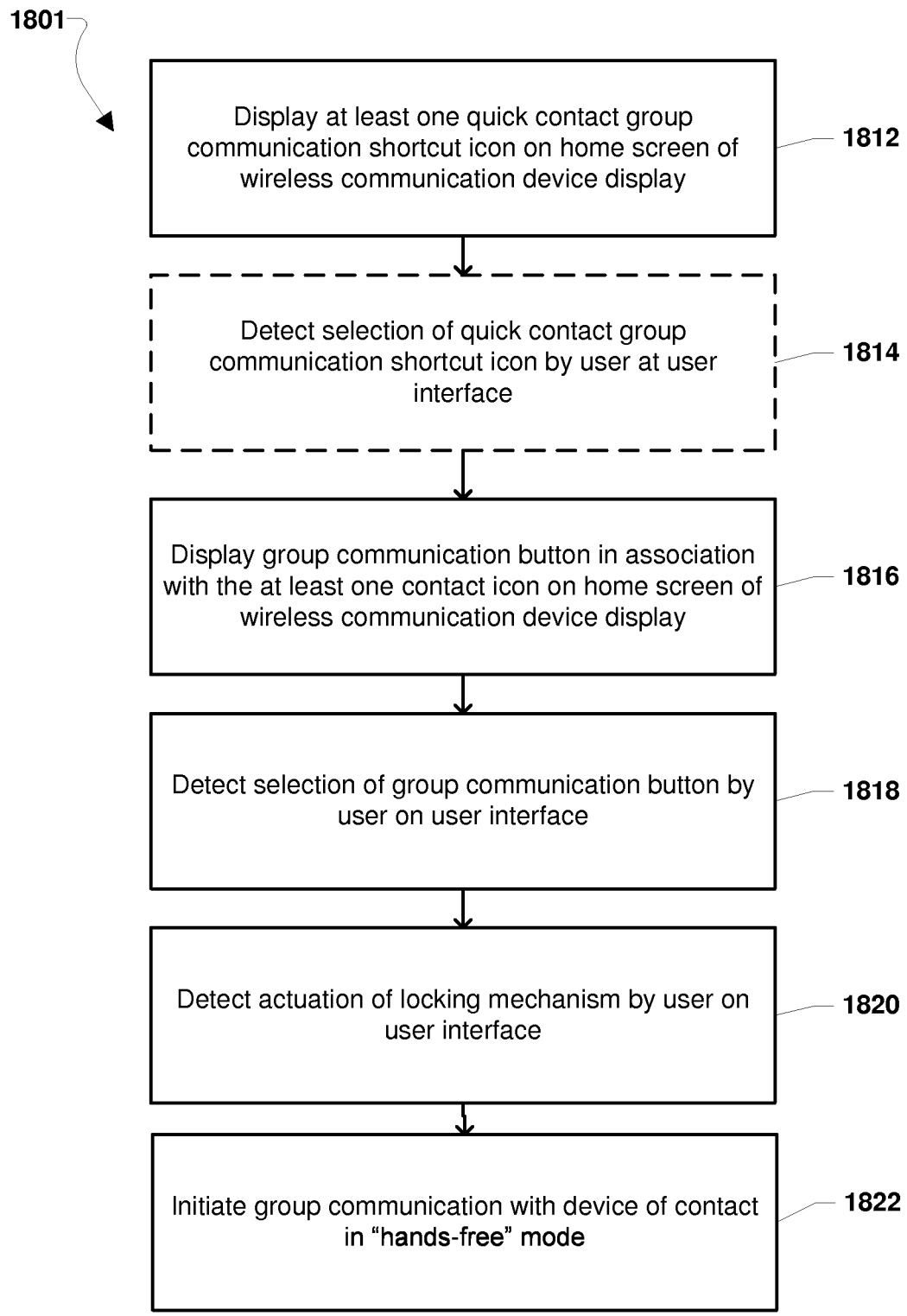
FIG. 18B is a process flow diagram illustrating an embodiment method of group communication using a "quick contact" shortcut and a sliding locking mechanism.

FIG. 18B is a process flow diagram illustrating an embodiment method 1801 for group communication, such as PTT communication, using a "quick contact" shortcut and a sliding locking mechanism. Blocks 1812-1816 are similar to blocks 1802-1806 of method 1800 shown in FIG. 18A, and include displaying at least one quick contact group communication shortcut icon on the home screen of a wireless communication device display 100 in block 1812, detecting a selection of a quick contact group communication shortcut icon by a user on a user interface in optional block 1814, and displaying a group communication button (e.g., a PTT button) in association with the quick contact group communication shortcut icon in block 1816. The device 100 may detect the actuation of a locking mechanism by the user on the user interface in block 1820. The locking mechanism may be a sliding lock that is displayed in response to user selection of the group communication button, such as shown in FIGS. 17A-C. Actuation of the sliding lock may initiate a "hands-free" mode of operation. The device 100 may initiate group communication with the device of the selected contact in "hands free" mode in block 1822. In alternative embodiments, the sliding lock mechanism may initiate any of the operating modes described above in connection with FIGS. 12-16B.

Figure 19:
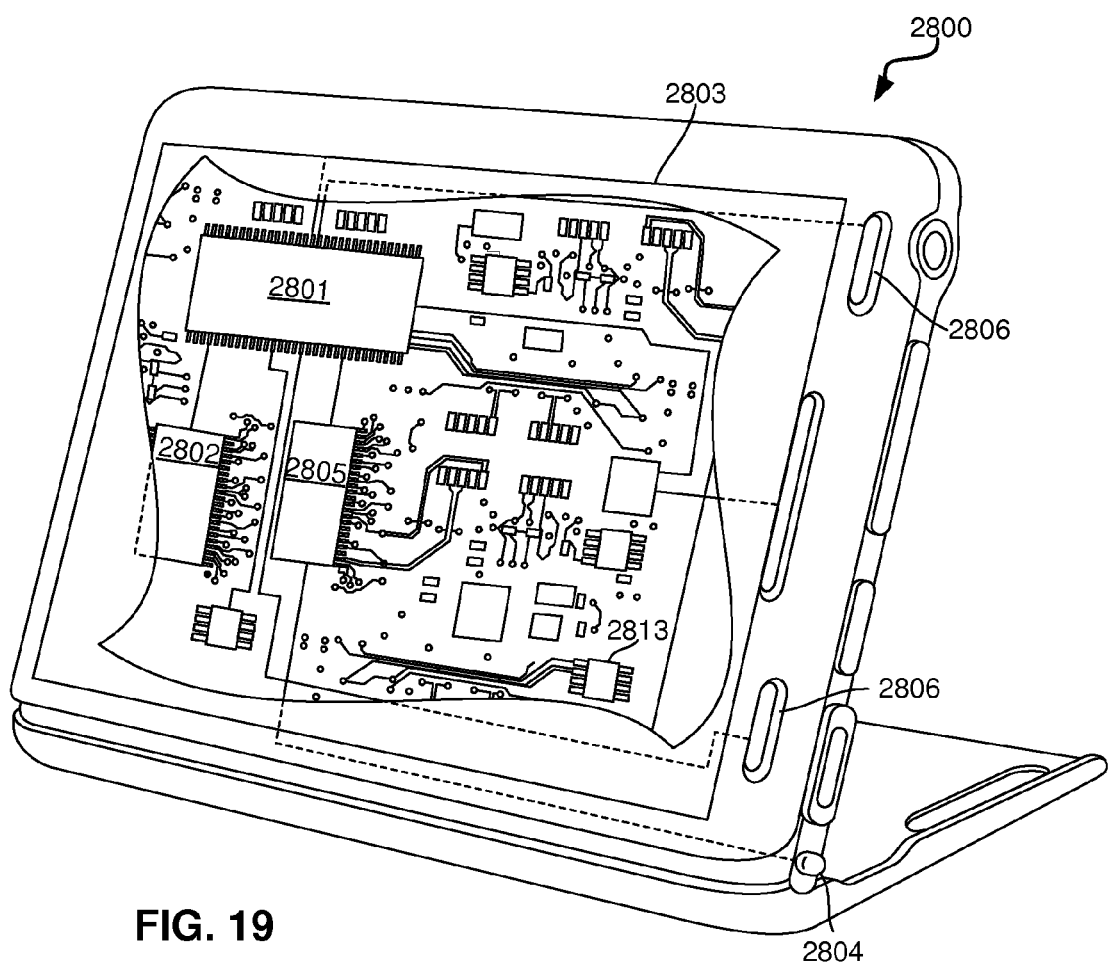
FIG. 19 is a system block diagram of a wireless communication device for use with various embodiments.

FIG. 19 is a system block diagram of a wireless communication device for use with any of the embodiments. The embodiments may be implemented in a variety of mobile wireless communication devices, particularly mobile computing devices. An example of a wireless communication device that may implement the various embodiments is a Smartphone 2800 illustrated in FIG. 19. A wireless communication device, such as a Smartphone 2800, may include a processor 2801 coupled to memory 2802 and to a radio frequency data modem 2805. The modem 2805 may be coupled to an antenna 2804 for receiving and transmitting radio frequency signals. The Smartphone 2800 may also include a display 2803, such as a touch screen display. The mobile device 2800 may also include user input devices, such as buttons 2806, to receive user inputs. In the various embodiments the Smartphone 2800 includes a tactile output surface, which may be positioned on the display 2803 (e.g., using E-Sense™ technology), on a back surface 2812, or another surface of the mobile device 2800. The mobile device processor 2801 may be any programmable microprocessor, microcomputer or multiple processor chip or chips that can be configured by software instructions (applications) to perform a variety of functions, including the functions of the various embodiments described herein. Typically, software applications may be stored in the internal memory 2802 before they are accessed and loaded into the processor 2801. In some mobile computing devices, additional memory chips (e.g., a Secure Data (SD) card) may be plugged into the mobile device and coupled to the processor 2801. The internal memory 2802 may be a volatile or nonvolatile memory, such as flash memory, or a mixture of both. For the purposes of this description, a general reference to memory refers to all memory accessible by the processor 2801, including internal memory 2802, removable memory plugged into the mobile device, and memory within the processor 2801.

Figure 20:
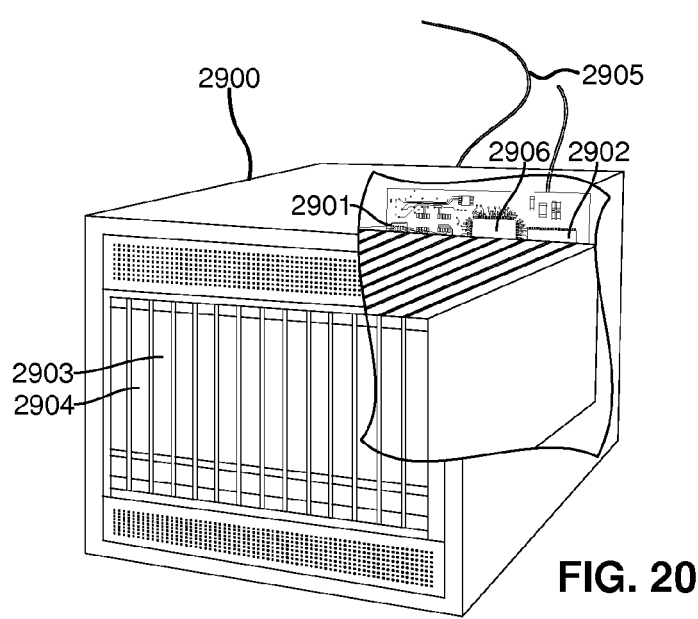
FIG. 20 is a system block diagram of a server suitable for use with various embodiments.

The various embodiments may be implemented on any of a variety of commercially available server devices, such as the server 2900 illustrated in FIG. 20. Such a server 2900 typically includes a processor 2901 coupled to volatile memory 2902 and a large capacity nonvolatile memory, such as a disk drive 2903. The server 2900 may also include a floppy disc drive, compact disc (CD) or DVD disc drive 2906 coupled to the processor 2901. The server 2900 may also include network access ports 2904 coupled to the processor 2901 for establishing data connections with a network 2905, such as a local area network coupled to other broadcast system computers and servers. The processors 2801, 2901 may be any programmable microprocessor, microcomputer or multiple processor chip or chips that can be configured by software instructions (applications) to perform a variety of functions, including the functions of the various embodiments described above. In some devices, multiple processors 2801, 2901 may be provided, such as one processor dedicated to wireless communication functions and one processor dedicated to running other applications. Typically, software applications may be stored in the internal memory 2802, 2902, and 2903 before they are accessed and loaded into the processor 2801, 2901.

The processor 2801, 2901 may include internal memory sufficient to store the application software instructions. In many devices the internal memory may be a volatile or non-volatile memory, such as flash memory, or a mixture of both. For the purposes of this description, a general reference to memory refers to memory accessible by the processor 2801, 2901 including internal memory or removable memory plugged into the device and memory within the processor 2801, 2901 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on as one or more instructions or code on a non-transitory computer-readable storage medium. The steps of a method or algorithm disclosed herein may be embodied in a processor-executable software module which may reside or be stored on a non-transitory computer-readable storage medium or processor-readable medium. Non-transitory computer-readable and processor-readable storage media may be any available media that may be accessed by a computer or processor. By way of example, and not limitation, such non-transitory computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of conducting a group communication session on a wireless communication device, comprising:
    displaying a quick contact group communication shortcut icon on a home screen of a display of the wireless communication device;
    displaying a group communication button in association with the quick contact group communication shortcut icon on the home screen of the display;
    detecting a selection of the group communication button by a user on a user interface; and
    initiating a group communication session with a device of a contact associated with the quick contact group communication shortcut icon in response to detecting the selection of the group communication button.

2. The method of claim 1, wherein the group communication session comprises a "Push-To-Talk" (PTT) communication.

3. The method of claim 1, wherein the device includes a touchscreen user interface display.

4. The method of claim 3, further comprising:
    displaying a locking mechanism in association with the quick contact group communication shortcut icon.

5. The method of claim 4, wherein the locking mechanism comprises a target-based sliding lock mechanism on a touchscreen user interface display.

6. A wireless communication device, comprising:
    a display;
    a memory; and
    a processor coupled to the display and to the memory and configured with processor-executable instructions to perform operations comprising:
        displaying a quick contact group communication shortcut icon on a home screen of the display;
        displaying a group communication button in association with the quick contact group communication shortcut icon on the home screen of the display;
        detecting a selection of the group communication button by a user on a user interface; and
        initiating a group communication session with a device of a contact associated with the quick contact group communication shortcut icon in response to detecting the selection of the group communication button.

7. The wireless communication device of claim 6, wherein the group communication session comprises a "Push-To-Talk" (PTT) communication.

8. The wireless communication device of claim 6, wherein the display comprises a touchscreen user interface display.

9. The wireless communication device of claim 8, wherein the processor is configured with processor-executable instructions to perform operations further comprising:
    displaying a locking mechanism in association with the quick contact group communication shortcut icon.

10. The wireless communication device of claim 9, wherein the locking mechanism comprises a target-based sliding lock mechanism implemented on a touchscreen user interface display.

11. A wireless communication device, comprising:
- means for displaying a quick contact group communication shortcut icon on a home screen of a display;
- means for displaying a group communication button in association with the quick contact group communication shortcut icon on the home screen of the display;
- means for detecting a selection of the group communication button by a user on a user interface; and
- means for initiating a group communication session with a device of contact associated with the quick contact group communication shortcut icon in response to detecting the selection of the group communication button.

12. The wireless communication device of claim 11, wherein the group communication session comprises a "Push-To-Talk" (PTT) communication.

13. The wireless communication device of claim 11, wherein the device includes a touchscreen user interface display.

14. The wireless communication device of claim 13, further comprising:
- means for displaying a locking mechanism in association with the quick contact group communication shortcut icon.

15. The wireless communication device of claim 14, wherein the locking mechanism comprises a target-based sliding lock mechanism on a touchscreen user interface display.

16. A non-transitory computer-readable storage medium having stored thereon processor executable instructions configured to cause a wireless communication device processor to perform operations comprising:
- displaying a quick contact group communication shortcut icon on a home screen of a display of a wireless communication device;
- displaying a group communication button in association with the quick contact group communication shortcut icon on the home screen of the display;
- detecting a selection of the group communication button by a user on a user interface; and
- initiating a group communication session with a device of a contact associated with the quick contact group communication shortcut icon in response to detecting the selection of the group communication button.

17. The non-transitory computer-readable storage medium of claim 16, wherein the stored processor executable instructions are configured to cause the wireless communication device processor to perform operations such that the group communication session comprises a "Push-To-Talk" (PTT) communication.

18. The non-transitory computer-readable storage medium of claim 16, wherein the stored processor executable instructions are configured to cause the wireless communication device processor to perform operations such that the device includes a touchscreen user interface display.

19. The non-transitory computer-readable storage medium of claim 18, wherein the stored processor executable instructions are configured to cause the wireless communication device processor to perform operations further comprising:
- displaying a locking mechanism in association with the quick contact group communication shortcut icon.

20. The non-transitory computer-readable storage medium of claim 19, wherein the stored processor executable instructions are configured to cause the wireless communication device processor to perform operations such that the locking mechanism comprises a target-based sliding lock mechanism on a touchscreen user interface display.

* * * * *